US012148438B2

(12) United States Patent
Beack et al.

(10) Patent No.: US 12,148,438 B2
(45) **Date of Patent: *Nov. 19, 2024**

(54) ENCODING APPARATUS AND DECODING APPARATUS FOR TRANSFORMING BETWEEN MODIFIED DISCRETE COSINE TRANSFORM-BASED CODER AND DIFFERENT CODER

(71) Applicants: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR)

(72) Inventors: Seung Kwon Beack, Daejeon (KR); Tae Jin Lee, Daejeon (KR); Min Je Kim, Daejeon (KR); Dae Young Jang, Daejeon (KR); Kyeongok Kang, Daejeon (KR); Jin Woo Hong, Daejeon (KR); Ho Chong Park, Seongnam-si (KR); Young-cheol Park, Wonju-si (KR)

(73) Assignees: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 134 days.

This patent is subject to a terminal disclaimer.

(21) Appl. No.: 17/373,243

(22) Filed: Jul. 12, 2021

(65) Prior Publication Data

US 2022/0005486 A1 Jan. 6, 2022

Related U.S. Application Data

(63) Continuation of application No. 15/714,273, filed on Sep. 25, 2017, now Pat. No. 11,062,718, which is a
(Continued)

(30) Foreign Application Priority Data

Sep. 18, 2008 (KR) ........................ 10-2008-0091697

(51) Int. Cl.
*G10L 19/022* (2013.01)
*G10L 19/02* (2013.01)
*G10L 19/18* (2013.01)

(52) U.S. Cl.
CPC ................................ *G10L 19/0212* (2013.01)

(58) Field of Classification Search
CPC ..... G10L 19/0017; G10L 19/02; G10L 19/04; G10L 19/173; G10L 19/18; G10L 19/20; G10L 19/022
(Continued)

(56) References Cited

U.S. PATENT DOCUMENTS 5,642,464 A 6/1997 Yue et al.
5,867,819 A * 2/1999 Fukuchi .............. G10L 19/0204 704/503
(Continued)

FOREIGN PATENT DOCUMENTS

CN 101025918 A 8/2007
EP 1793372 A1 * 6/2007 ......... G10L 19/0212
(Continued)

OTHER PUBLICATIONS

ITU-T Recommendation G.722.2: Series G: Transmission Systems and Media, Digital Systems and Networks; Wideband coding of speech at around 16 kbit/s using Adaptive Multi-Rate Wideband (AMR-WB), Jul. 2003, 72 pages.
(Continued)

*Primary Examiner* — Martin Lerner

(74) *Attorney, Agent, or Firm* — STAAS & HALSEY LLP

(57) ABSTRACT

An encoding apparatus and a decoding apparatus in a transform between a Modified Discrete Cosine Transform (MDCT)-based coder and a different coder are provided. The encoding apparatus may encode additional information to restore an input signal encoded according to the MDCT-based coding scheme, when switching occurs between the MDCT-based coder and the different coder. Accordingly, an unnecessary bitstream may be prevented from being generated, and minimum additional information may be encoded.

5 Claims, 18 Drawing Sheets

Related U.S. Application Data continuation of application No. 13/057,832, filed as application No. PCT/KR2009/005340 on Sep. 18, 2009, now Pat. No. 9,773,505.

(58) Field of Classification Search
USPC ........ 704/203, 205, 206, 219, 500, 501, 502
See application file for complete search history.

(56) References Cited

U.S. PATENT DOCUMENTS

| | | | |
|---|---|---|---|
| 6,134,518 A | 10/2000 | Cohen et al. | |
| 6,658,383 B2 | 12/2003 | Koishida et al. | |
| 7,117,156 B1 * | 10/2006 | Kapilow | G10L 19/0017 714/776 |
| 7,194,407 B2 | 3/2007 | Yin | |
| 7,325,023 B2 | 1/2008 | Youn | |
| 7,386,445 B2 | 6/2008 | Ojala | |
| 7,454,353 B2 | 11/2008 | Sperschneider et al. | |
| 7,593,852 B2 | 9/2009 | Gao et al. | |
| 7,596,486 B2 | 9/2009 | Ojala et al. | |
| 7,787,632 B2 | 8/2010 | Ojanpera | |
| 7,876,966 B2 | 1/2011 | Ojanpera | |
| 8,095,359 B2 | 1/2012 | Boehm et al. | |
| 8,260,620 B2 | 9/2012 | Ragot et al. | |
| 8,898,059 B2 | 11/2014 | Beack et al. | |
| 8,954,321 B1 | 2/2015 | Beack et al. | |
| 9,384,748 B2 | 7/2016 | Beack et al. | |
| 9,773,505 B2 | 9/2017 | Beack et al. | |
| 10,002,619 B2 | 6/2018 | Beack et al. | |
| 10,622,001 B2 | 4/2020 | Beack et al. | |
| 11,062,718 B2 * | 7/2021 | Beack | G10L 19/0212 |
| 2002/0007273 A1 | 1/2002 | Chen | |
| 2003/0004711 A1 | 1/2003 | Koishida et al. | |
| 2003/0009325 A1 | 1/2003 | Kirchherr et al. | |
| 2004/0049376 A1 | 3/2004 | Sperschneider et al. | |
| 2004/0162911 A1 | 8/2004 | Sperschneider et al. | |
| 2004/0267532 A1 | 12/2004 | Black | |
| 2005/0017879 A1 | 1/2005 | Linzmeier et al. | |
| 2005/0163323 A1 | 7/2005 | Oshikiri | |
| 2006/0161427 A1 | 7/2006 | Ojala | |
| 2007/0147518 A1 | 6/2007 | Bessette | |
| 2007/0219787 A1 | 9/2007 | Manjunath et al. | |
| 2008/0065373 A1 | 3/2008 | Oshikiri | |
| 2009/0012797 A1 | 1/2009 | Boehm et al. | |
| 2009/0306992 A1 | 12/2009 | Ragot et al. | |
| 2010/0138218 A1 | 6/2010 | Geiger | |
| 2010/0241433 A1 | 9/2010 | Herre et al. | |
| 2011/0153333 A1 | 6/2011 | Bessette | |
| 2011/0173010 A1 | 7/2011 | Lecomte et al. | |
| 2018/0322883 A1 | 11/2018 | Bayer et al. | |

FOREIGN PATENT DOCUMENTS

| | | | | |
|---|---|---|---|---|
| EP | 1903559 A1 * | 3/2008 | G10L 19/022 |
| JP | 2003-44097 | 2/2003 | |
| JP | 2007-512546 | 5/2007 | |
| KR | 10-2007-0012194 | 1/2007 | |
| WO | 2004/082288 A1 | 9/2004 | |
| WO | WO-2005001813 A1 * | 1/2005 | G10L 19/022 |
| WO | WO-2005/078706 * | 8/2005 | G10L 19/0208 |
| WO | WO-2008157296 A1 * | 12/2008 | G10L 19/022 |

OTHER PUBLICATIONS

3GPP TS 26.290 v6.3.0, 3rd Generation Partnership Project; Technical Specification Group Service and System Aspects; Audio codec processing functions; Extended Adaptive Multi-Rate—Wideband (AMRWB+) codec; Transcoding functions (Release 6), Jun. 2005, 86 pages.

Lecomte et al., "Efficient cross-fade windows for transitions between LPC-based and non-LPC based audio coding", Audio Engineering Society (AES) $12_{th}$ Convention, Munich, Germany May 7-10, 2009, Convention Paper 7712, pp. 1-9.

Bessette et al., "Universal Speech/Audio Coding Using Hybrid ACELP/TCX Techniques", IEEE International Conference on Acoustics, Speech, and Signal Processing 2005, vol. 3, Mar. 18-23, 2005, pp. III-301-III-304.

Wikipedia, "Adaptive Multi-Rate Wideband", 8 pages, downloaded Sep. 16, 2016.

International Search Report mailed Aug. 23, 2010 in corresponding International Patent Application No. PCT/KR2009/005340.

Makino, K. et al., "Hybrid audio coding for speech and audio below medium bit rate"; 2000 Digest of Technical Papers, International Conference on Consumer Electronics; Los Angeles, CA; Jun. 13-15, 2000, 1 page.

Office Action dated Apr. 8, 2013 in co-pending U.S. Appl. No. 13/057,832.

Office Action dated Jul. 23, 2014 in co-pending U.S. Appl. No. 13/057,832.

Office Action dated May 12, 2015 in co-pending U.S. Appl. No. 13/057,832.

Office Action dated Jan. 25, 2016 in co-pending U.S. Appl. No. 13/057,832.

Office Action dated Nov. 4, 2016 in co-pending U.S. Appl. No. 13/057,832.

Final Office Action dated Aug. 27, 2013 in co-pending U.S. Appl. No. 13/057,832.

Final Office Action dated Nov. 13, 2014 in co-pending U.S. Appl. No. 13/057,832.

Final Office Action dated Sep. 1, 2015 in co-pending U.S. Appl. No. 13/057,832.

Final Office Action dated May 20, 2016 in co-pending U.S. Appl. No. 13/057,832.

Advisory Action dated Nov. 10, 2015 in co-pending U.S. Appl. No. 13/057,832.

Advisory Action dated Jul. 25, 2016 in co-pending U.S. Appl. No. 13/057,832.

Quayle Office Action dated Mar. 28, 2017 in co-pending U.S. Appl. No. 13/057,832.

Notice of Allowance dated May 18, 2017 in co-pending U.S. Appl. No. 13/057,832.

Office Action dated Sep. 4, 2018 in co-pending U.S. Appl. No. 15/714,273.

Office Action dated Dec. 21, 2018 in co-pending U.S. Appl. No. 15/714,273.

Office Action dated May 6, 2019 in co-pending U.S. Appl. No. 15/714,273.

Office Action dated Aug. 30, 2019 in co-pending U.S. Appl. No. 15/714,273.

Advisory Action dated Nov. 8, 2019 in co-pending U.S. Appl. No. 15/714,273.

Office Action dated Jan. 22, 2020 in co-pending U.S. Appl. No. 15/714,273.

(56) References Cited

OTHER PUBLICATIONS

Office Action dated May 1, 2020 in co-pending U.S. Appl. No. 15/714,273.
Advisor Action Jul. 13, 2020 in co-pending U.S. Appl. No. 15/714,273.
Office Action dated Oct. 19, 2020 in co-pending U.S. Appl. No. 15/714,273.
Notice of Allowance dated Mar. 8, 2021 in co-pending U.S. Appl. No. 15/714,273.
U.S. Appl. No. 15/714,273, filed Sep. 25, 2017, Seung Kwon Beack et al., Electronics and Telecommunications Research Institute and Kwangwoon University Industry-Academic Collaboration Foundation.
U.S. Appl. No. 13/057,832, filed Feb. 7, 2011, Seung Kwon Beack et al., Electronics and Telecommunications Research Institute and Kwangwoon University Industry-Academic Collaboration Foundation.

* cited by examiner

ENCODING APPARATUS AND DECODING APPARATUS FOR TRANSFORMING BETWEEN MODIFIED DISCRETE COSINE TRANSFORM-BASED CODER AND DIFFERENT CODER

CROSS REFERENCE TO RELATED APPLICATIONS

This application is a continuation of U.S. patent application Ser. No. 15/714,273, filed Sep. 25, 2017, now U.S. Pat. No. 11,062,718, issued Jul. 13, 2021 which is a continuation of U.S. patent application Ser. No. 13/057,832, filed Feb. 7, 2011, now U.S. Pat. No. 9,773,505, which claims the benefit under 35 U.S.C. Section 371 of International Application No. PCT/KR2009/005340, filed Sep. 18, 2009, which claimed priority to Korean Application No. 10-2008-0091697, filed Sep. 18, 2008, the disclosures of which are hereby incorporated by reference.

TECHNICAL FIELD

The present invention relates to an apparatus and method for reducing an artifact, generated when transform is performed between different types of coders, when an audio signal is encoded and decoded by combining a Modified Discrete Cosine Transform (MDCT)-based audio coder and a different speech/audio coder.

BACKGROUND ART

When an encoding/decoding; method is differently applied to an input signal where a speech and audio are combined depending on a characteristic of the input signal, a performance and a sound quality may be improved. For example, it may be efficient to apply a Code Excited Linear Prediction (CLP)-based encoder to a signal having a similar characteristic to a speech signal, and to apply a frequency conversion-based encoder to a signal identical to an audio signal.

A Unified Speech and Audio Coding (USAC) may be developed by applying the above-described concepts. The USAC may continuously receive an input signal and analyze a characteristic of the input signal at particular times. Then, the USAC may encode the input signal by applying different types of encoding apparatuses through switching depending on the characteristic of the input signal.

A signal artifact may be generated during signal switching in the USAC. Since the USAC encodes an input signal for each block, a blocking artifact may be generated when different types of encodings are applied. To overcome such a disadvantage, the USAC may perform an overlap-add operation by applying a window to blocks where different encodings are applied However, additional bitstream information may be required due to the overlap, and when switching frequently occurs, an additional bitstream to remove blocking artifact may increase. When a bitstream increases, an encoding efficiency may be reduced.

In particular, the USAC may encode an audio characteristic signal using a Modified Discrete Cosine Transform (MDCT)-based encoding apparatus. An MDCT scheme may transform an input signal of a time domain into an input signal of a frequency domain, and perform an overlap-add operation among blocks. In an MDCT scheme, aliasing may be generated in a time domain, whereas a bit rate may not increase even when an overlap-add operation is performed.

In this instance, a 50% overlap-add operation is to be performed with a neighbor block to restore an input signal based on an MDCT scheme. That is, a current block to be outputted may be decoded depending on an output result of a previous block. However, when the previous block is not encoded using the USAC using an MDCT scheme, the current block, encoded using the MDCT scheme, may not be decoded through an overlap-add operation since MDCT information of the previous block may not be used Accordingly, the USAC may additionally require the MDCT information of the previous block, when encoding a current block using an MDCT scheme after switching.

When switching frequently occurs, additional MDCT information for decoding may be increased in proportion to the number of switchings. In this instance, a bit rate may increase due to the additional MDCT information, and a coding efficiency may significantly decrease. Accordingly, a method that may remove blocking artifact and reduce the additional MDCT information during switching is required.

DISCLOSURE OF INVENTION

Technical Goals

An aspect of the present invention provides an encoding method and apparatus and a decoding method and apparatus that may remove a blocking artifact and reduce required MDCT information.

According to an aspect of the present invention, there is provided a first encoding unit to encode a speech characteristic signal of an input signal according to a coding scheme different from a Modified Discrete Cosine Transform (MDCT)-based coding scheme; and a second encoding unit to encode an audio characteristic signal of the input signal according to the MDCT-based coding scheme. The second encoding unit may perform encoding by applying an analysis window which does not exceed a folding point, when the folding point where switching occurs between the speech characteristic signal and the audio characteristic signal exists in a current frame of the input signal. Here, the folding point may be an area where aliasing signals are folded when an MDCT and an Inverse MDCT (IMDCT) are performed. When a N-point MDCT is performed, the folding point may be located at a point of N/4 and 3N/4. The folding point may be any one of well-known characteristics associated with an MDCT, and a mathematical basis for the folding point is not described herein. Also, a concept of the MDCT and the folding point is described in detail with reference to FIG. 5.

Also, for ease of description, when a previous frame signal is a speech characteristic signal and a current frame signal is an audio characteristic signal, the folding point, used when connecting the two different types of characteristic signals, may be referred to as a 'folding point where switching occurs' hereinafter. Also, when a later frame signal is a speech characteristic signal, and a current frame signal is an audio characteristic signal, the folding point used when connecting the two different types of characteristic signals, may be referred to as a 'folding point where switching occurs'.

Technical Solutions

According to an aspect of the present invention, there is provided an encoding apparatus, including: a window processing unit to apply an analysis window to a current frame of an input signal; an MDCT unit to perform an MDCT with respect to the current frame where the analysis window is applied; a bitstream generation unit to encode the current frame and to generate a bitstream of the input signal. The window processing unit may apply an analysis window which does not exceed a folding point, when the folding point where switching occurs between a speech characteristic signal and an audio characteristic signal exists in the current frame of the input signal.

According to an aspect of the present invention, there is provided a decoding apparatus, including: a first decoding unit to decode a speech characteristic signal of an input signal encoded according to a coding scheme different from an MDCT-based coding scheme; a second decoding unit to decode an audio characteristic signal of the input signal encoded according to the MDCT-based coding scheme; and a block compensation unit to perform block compensation with respect to a result of the first decoding unit and a result of the second decoding unit, and to restore the input signal. The block compensation unit may apply a synthesis window which does not exceed a folding point, when the folding point where switching occurs between the speech characteristic signal and the audio characteristic signal exists in a current frame of the input signal.

According to an aspect of the present invention, there is provided a decoding apparatus, including: a block compensation unit to apply a synthesis window to additional information extracted from a speech characteristic signal and a current frame and to restore an input signal, when a folding point where switching occurs between the speech characteristic signal and the audio characteristic signal exists in the current frame of the input signal.

Advantageous Effects

According to an aspect of the present invention, there is provided an encoding apparatus and method and a decoding apparatus and method that may reduce additional MDCT information required when switching occurs between different types of coders depending on a characteristic of an input signal, and remove a blocking artifact.

Also, according to an aspect of the present invention, there is provided an encoding apparatus and method and a decoding apparatus and method that may reduce additional MDCT information required when switching occurs between different types of coders, and thereby may prevent a bit rate from increasing and improve a coding efficiency.

BEST MODE FOR CARRYING OUT THE INVENTION

Figure 1:
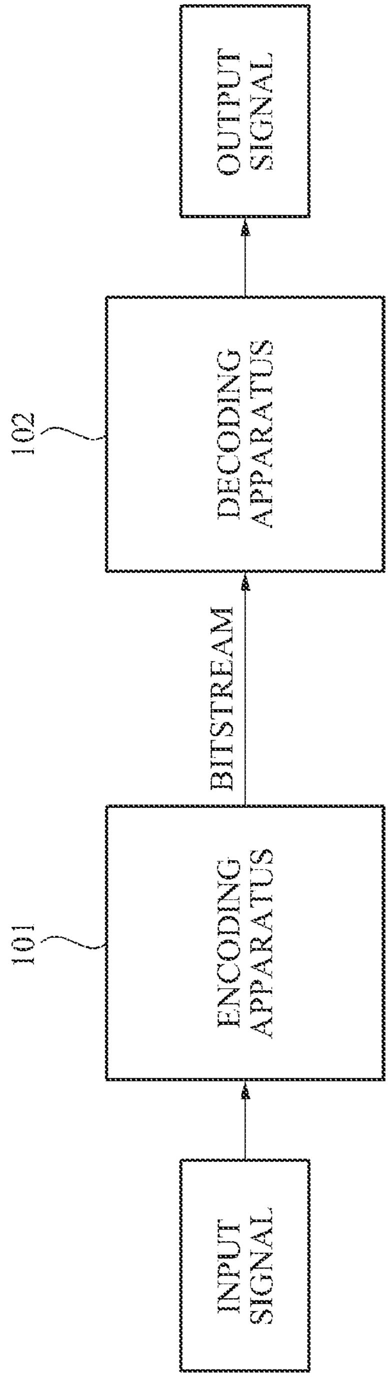
FIG. 1 is a block diagram illustrating an encoding apparatus and a decoding apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an encoding apparatus 101 and a decoding apparatus 102 according to an embodiment of the present invention.

The encoding apparatus 101 may generate a bitstream by encoding an input signal for each block. In this instance, the encoding apparatus 101 may encode a speech characteristic signal and an audio characteristic signal. The speech characteristic signal may have a similar characteristic to a voice signal, and the audio characteristic signal may have a similar characteristic to an audio signal. The bitstream with respect to an input signal may be generated as a result of the encoding, and be transmitted to the decoding apparatus 102. The decoding apparatus 101 may generate an output signal by decoding the bitstream, and thereby may restore the encoded input signal.

Specifically, the encoding apparatus 101 may analyze a state of the continuously inputted signal, and switch to enable an encoding scheme corresponding to the characteristic of the input signal to be applied according to a result of the analysis. Accordingly, the encoding apparatus 101 may encode blocks where a coding scheme is applied. For example, the encoding apparatus 101 may encode the speech characteristic signal according to a Code Excited Linear Prediction (CELP) scheme, and encode the audio characteristic signal according to a Modified Discrete Cosine Transform (MDCT scheme. Conversely, the decoding apparatus 102 may restore the input signal by decoding the input signal, encoded according to the CELP scheme, according to the CELP scheme and by decoding the input signal, encoded according to the MDCT scheme, according to the MDCT scheme.

In this instance, when the input signal is switched to the audio characteristic signal from the speech characteristic signal, the encoding apparatus 101 may encode by switching from the CELP scheme to the MDCT scheme. Since the encoding is performed for each block, blocking artifact may be generated. In this instance, the decoding apparatus 102 may remove the blocking artifact through an overlap-add operation among blocks.

Also, when a current block of the input signal is encoded according to the MDCT scheme, mDcr information of a previous block is required to restore the input signal. However, when the previous block is encoded according to the CELP scheme, since MDCT information of the previous block does not exist, the current block may not be restored according to the MOCK scheme. Accordingly, additional MDCT information of the previous block is required. Also, the encoding apparatus 101 may reduce the additional MDCT information, and thereby may prevent a bit rate from increasing.

Figure 2:
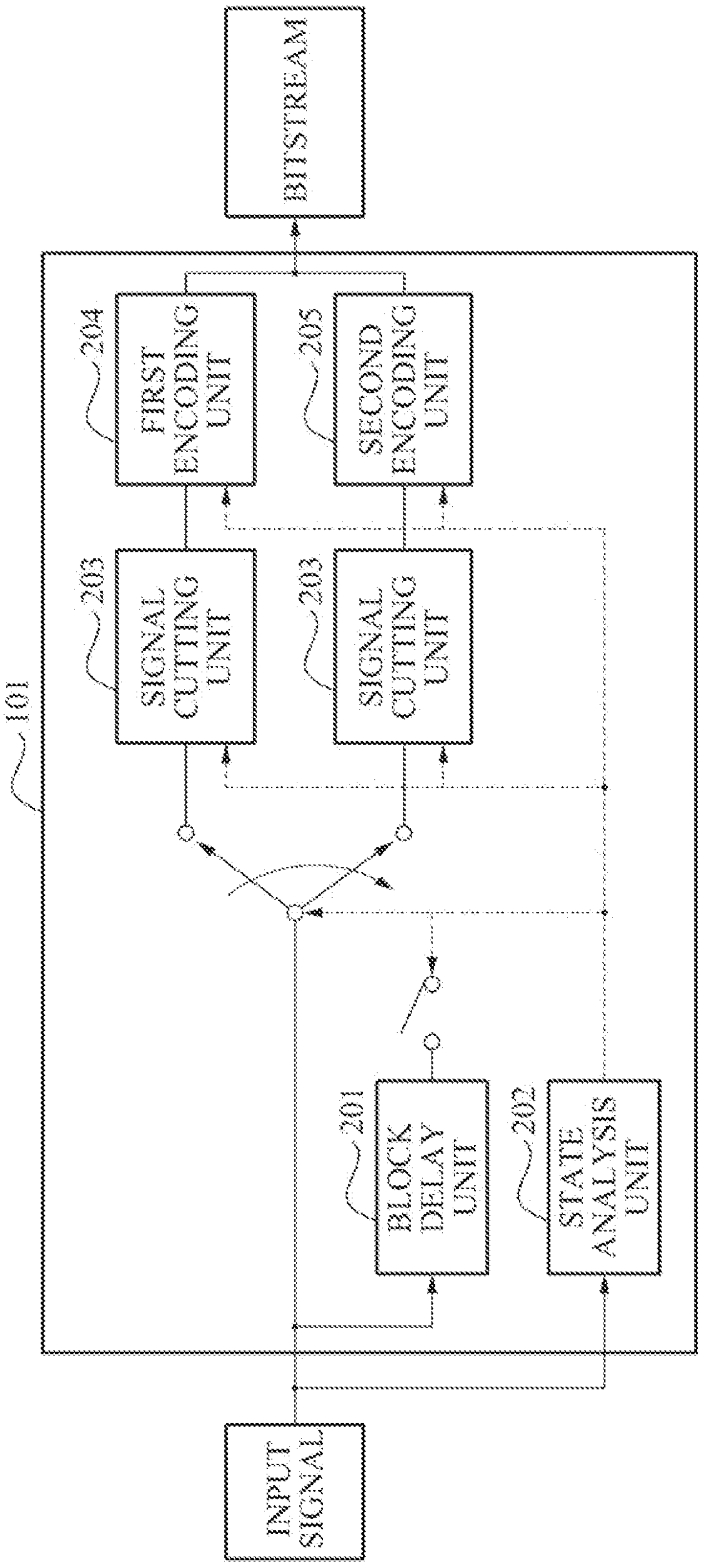
FIG. 2 is a block diagram illustrating a configuration of an encoding apparatus according to an embodiment of the present invention.

FIG. 2 is a block diagram illustrating a configuration of an encoding apparatus 101 according to an embodiment of the present invention.

Referring to FIG. 2, the encoding apparatus 101 may include a block delay unit 201, a state analysis unit 202, a signal cutting unit 203, a first encoding unit 204, and a second encoding unit 205.

The block delay unit 201 may delay an input signal for each block. The input signal may be processed for each block for encoding. The block delay unit 201 may delay back (−) or delay ahead (+) the inputted current block.

The state analysis unit 202 may determine a characteristic of the input signal. For example, the state analysis unit 202 may determine whether the input signal is a speech characteristic signal or an audio characteristic signal. In this instance, the state analysis unit 202 may output a control parameter. The control parameter may be used to determine which encoding scheme is used to encode the current block of the input signal.

For example, the state analysis unit 202 may analyze the characteristic of the input signal, and determine, as the speech characteristic signal, a signal period corresponding to (1) a steady-harmonic (SH) state showing a clear and stable harmonic component, (2) a low steady harmonic (LSH) state showing a strong steady characteristic in a low frequency bandwidth and showing a harmonic component of a relatively long period, and (3) a steady-noise (SN) state which is a white noise state. Also, the state analysis unit 202 may analyze the characteristic of the input signal, and determine, as the audio characteristic signal, a signal period corresponding to (4) a complex-harmonic (CH) state showing a complex harmonic structure where various tone components are combined, and (5) a complex-noisy (CN) state including unstable noise components. Here, the signal period may correspond to a block unit of the input signal.

The signal cutting unit 203 may enable the input signal of the block unit to be a sub-set.

The first encoding unit 204 may encode the speech characteristic signal from among input signals of the block unit. For example, the first encoding unit 204 may encode the speech characteristic signal in a time domain according to a Linear Predictive Coding (LPC). In this instance, the first encoding unit 204 may encode the speech characteristic signal according to a CELP-based coding scheme. Although a single first encoding unit 204 is illustrated in FIG. 2, one or more first encoding unit may be configured.

The second encoding unit 205 may encode the audio characteristic signal from among the input signals of the block unit. For example, the second encoding unit 205 may transform the audio characteristic signal from the time domain to the frequency domain to perform encoding. In this instance, the second encoding unit 205 may encode the audio characteristic signal according to an MDCT-based coding scheme. A result of the first decoding unit 204 and a result of the second encoding unit 205 may be generated in a bitstream, and the bitstream generated in each of the encoding units may be controlled to be a single bitstream through a bitstream multiplexer (MUX).

That is, the encoding apparatus 101 may encode the input signal through any one of the first encoding unit 204 and the second encoding unit 205, by switching depending on a control parameter of the state analysis unit 202. Also, the first encoding unit 204 may encode the speech characteristic signal of the input signal according to the coding scheme different from the MDCT-based coding scheme. Also, the second encoding unit 205 may encode the audio characteristic signal of the input signal according to the MDCT-based coding scheme.

Figure 3:
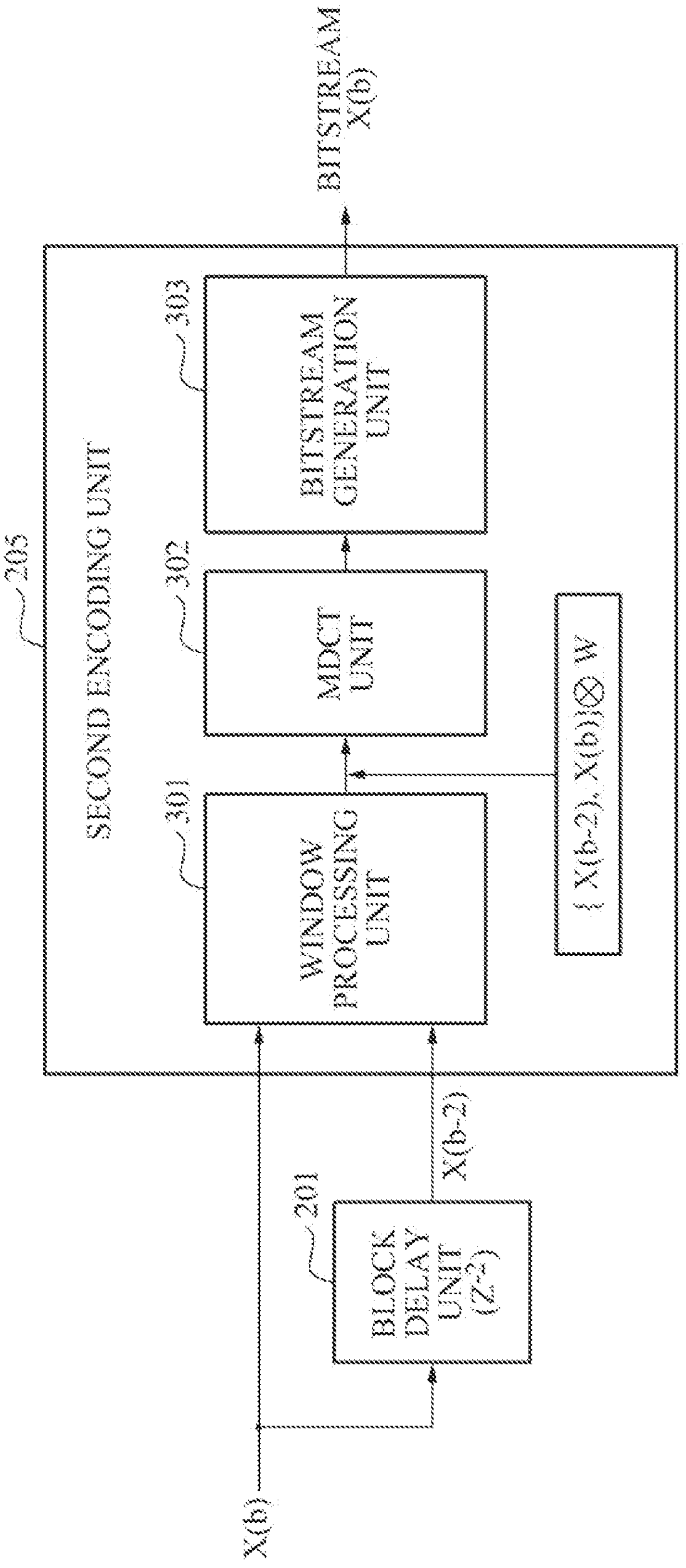
FIG. 3 is a diagram illustrating an operation of encoding an input signal through a second encoding unit according to an embodiment of the present invention.

FIG. 3 is a diagram illustrating an operation of encoding an input signal through a second encoding unit 205 according to an embodiment of the present invention.

Referring to FIG. 3, the second encoding unit 205 may include a window processing unit 301, an MDCT unit 302, and a bitstream generation unit 303.

In FIG. 3, X(b) may denote a basic block unit of the input signal. The input signal is described in detail with reference FIG. 4 and FIG. 6. The input signal may be inputted to the window processing unit 301, and also may be inputted to the window processing unit 301 through the block delay unit 201.

The window processing unit 301 may apply an analysis window to a current frame of the input signal, Specifically, the window processing unit 301 may apply the analysis window to a current block X(b) and a delayed block X(b−2). The current block X(b) may be delayed back to the previous block X(b−2) through the block delay unit 201.

For example, the window processing unit 301 may apply an analysis window, which does not exceed a folding point, to the current frame, when a folding point where switching occurs between a speech characteristic signal and an audio characteristic signal exists in the current frame. In this instance, the window processing unit 301 may apply the analysis window which is configured as a window which has a value of 0 and corresponds to a first sub-block, a window corresponding to an additional information area of a second sub-block, and a window which has a value of 1 and corresponds to a remaining area of the second sub-block based on the folding point. Here, the first sub-block may indicate the speech characteristic signal, and the second sub-block may indicate the audio characteristic signal.

A degree of block delay, performed by the block delay unit 201, may vary depending on a block unit of the input signal. When the input signal passes through the window processing unit 301, the analysis window may be applied, and thus $\{X(b-2), X(b)\} \otimes W_{analysis}$ may be extracted. Accordingly, the MDCT unit 302 may perform an MDCT with respect to the current frame where the analysis window is applied. Also, the bitstream generation unit 303 may encode the current frame and generate a bitstream of the input signal.

Figure 4:
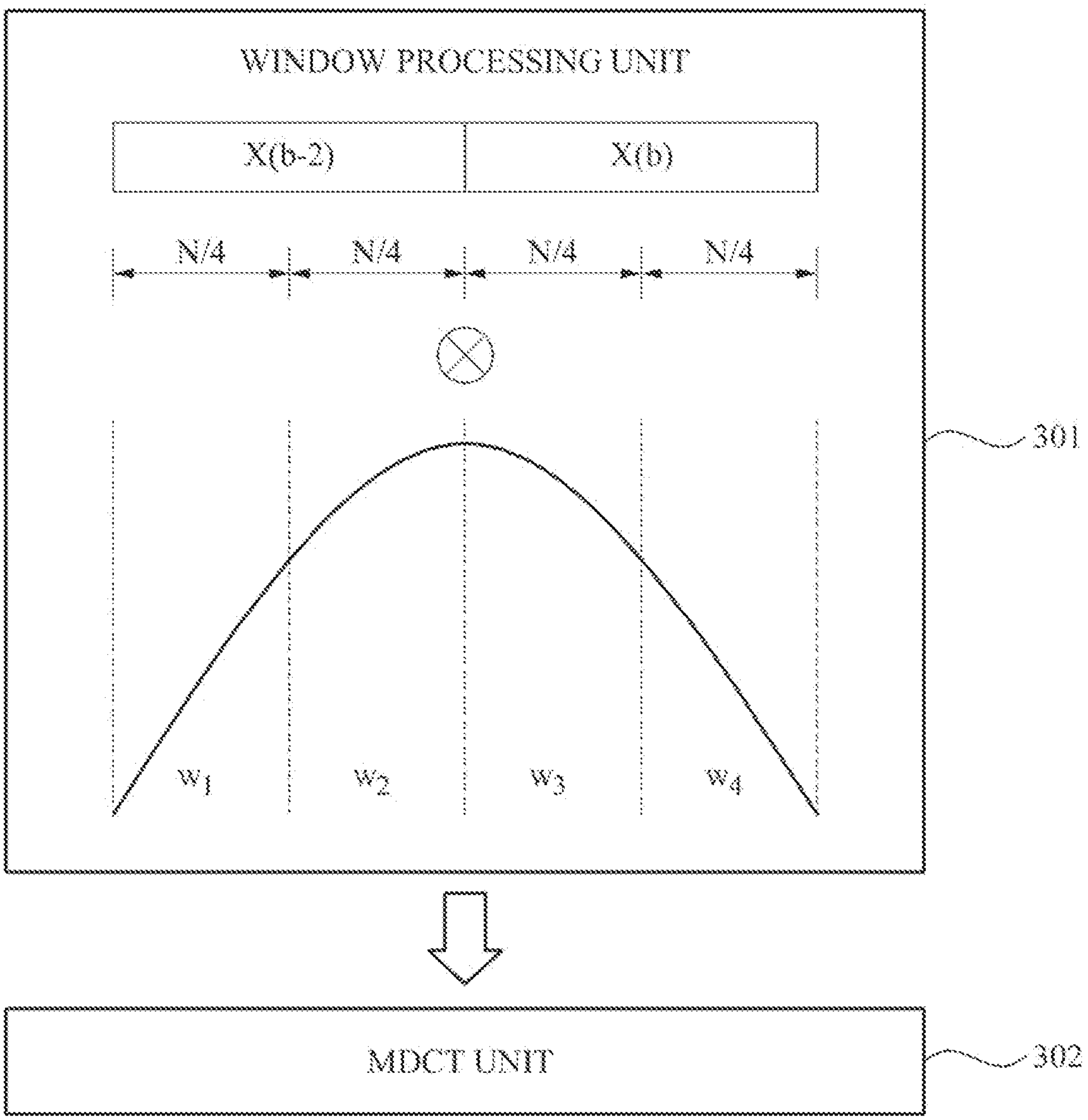
FIG. 4 is a diagram illustrating an operation of encoding an input signal through window processing according to an embodiment of the present invention.

FIG. 4 is a diagram illustrating an operation of encoding an input signal through window processing according to an embodiment of the present invention.

Referring to FIG. 4, the window processing unit 301 may apply the analysis window to the input signal. In this instance, the analysis window may be in a form of a rectangle or a sine. A form of the analysis window may vary depending on the input signal.

When the current block X(b) is inputted, the window processing unit 301 may apply the analysis window to the current block X(b) and the previous block X(b−2). Here, the previous block X(b−2) may be delayed back by the block delay unit 102, For example, the block X(b) may be set as a basic unit of the input signal according to Equation 1 given as below. In this instance, two blocks may be set as a single frame and encoded.

$$X(b)=[s(b-1),s(b)]^T \quad \text{[Equation 1]}$$

In this instance, s(b) may denote a sub-block configuring a single block, and may be defined by, $$s(b)=[s((b-1)\cdot N/4),s((b-1)\cdot N/4+1), \ldots ,s((b-1)\cdot N/4+N/4-1)]^T \quad \text{[Equation 2]}$$

(n): a sample of an input signal

Here, N may denote a size of a block of the input signal. That is, a plurality of blocks may be included in the input signal, and each of the blocks may include two sub-blocks. A number of sub-blocks included in a single block may vary depending on a system configuration and the input signal.

For example, the analysis window may be defined according to Equation 3 given as below Also, according to Equation 2 and Equation 3, a result of applying the analysis window to a current block of the input signal may be represented as Equation 4.

$$W_{analysis}=[w_1,w_2,w_3,w_4]^T{}_{10}$$

$$w_i=[w_i=w_i(0), \ldots ,w_i(N/4-1)]^T \quad \text{[Equation 3]}$$

$$[X(b-2),X(b)]^T \otimes w_{analysis}=[s((b-2)N/4)\cdot w_1(0), \ldots ,s((b-1)N/4+N/4-1)\cdot w_4(N/4-1)]^T \quad \text{[Equation 4]}$$

$W_{analysis}$ may denote the analysis window, and have a symmetric characteristic. As illustrated in FIG. 4, the analysis window may be applied to two blocks. That is, the analysis window may be applied to four sub-blocks. Also, the window processing unit 301 may perform 'point by point' multiplication with respect to an N-point of the input signal. The N-point may indicate an MDCT size. That is, the window processing unit 301 may multiply a sub-block with an area corresponding to a sub-block of the analysis window.

The MDCT unit 302 may perform an MDCT with respect to the input signal where the analysis window is processed.

Figure 5:
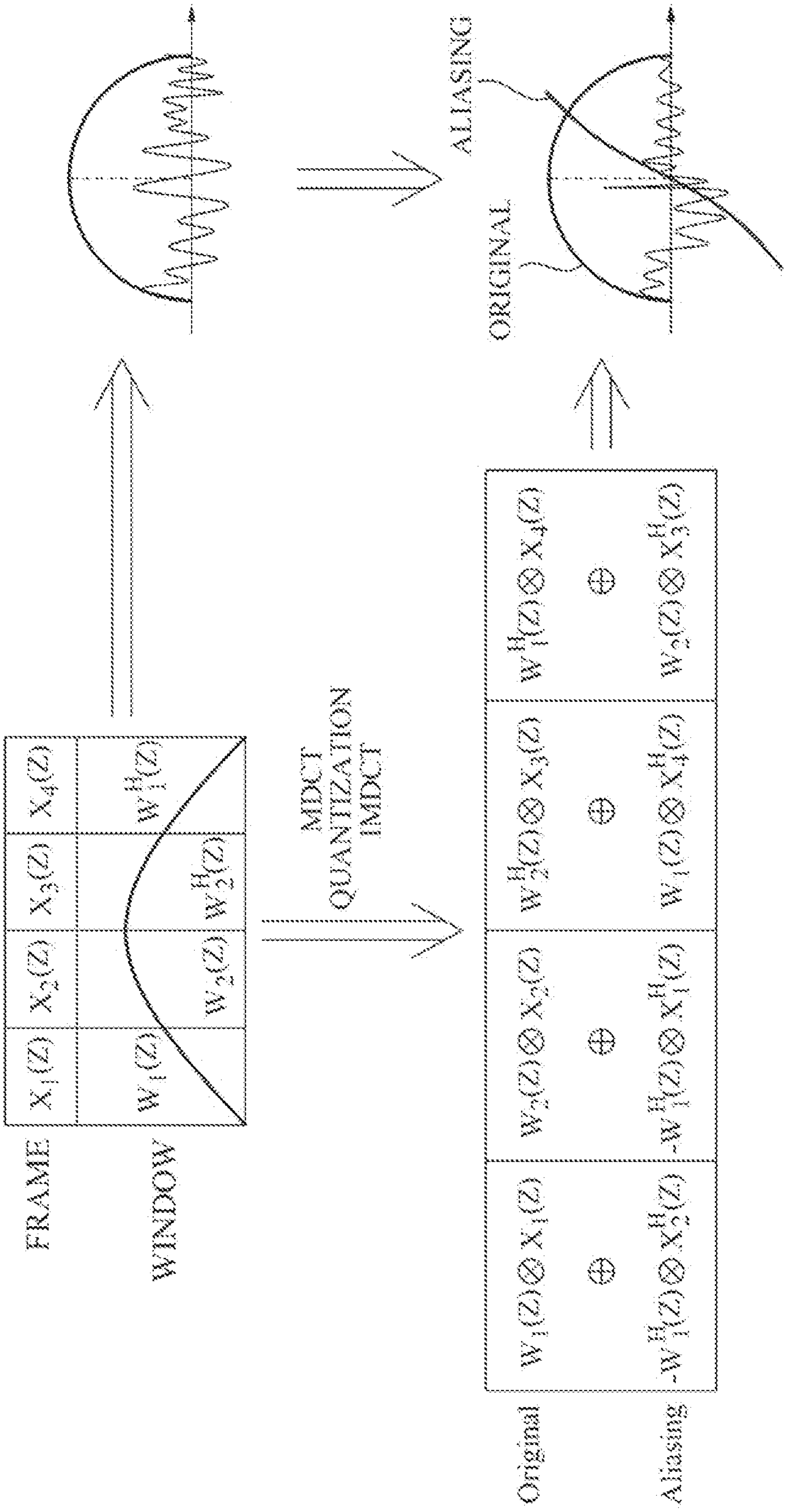
FIG. 5 is a diagram illustrating a Modified. Discrete Cosine Transform (NIDCT) operation according to an embodiment of the present invention.

FIG. 5 is a diagram illustrating an MDCT operation according to an embodiment of the present invention.

An input signal configured as a block unit and an analysis window applied to the input signal are illustrated in FIG. 5. As described above, the input signal may include a frame including a plurality of blocks, and a single block may include two sub-blocks.

The encoding apparatus 101 may apply an analysis window $W_{analysis}$ to the input signal. The input signal may be divided into four sub-blocks $X_1(Z)$,$X_2(Z)$, $X_3(Z)$, $X_4(Z)$ included in a current frame, and the analysis window may be divided into $W_1(Z)$, $W_2(Z)$, $W_2^H(Z)$, $W_1^H(Z)$. Also, when an MDCT/quatization/Inverse MDCT (IMDCT) is applied to the input signal based on the folding point dividing the sub-blocks, an original area and aliasing area may occur.

The decoding apparatus 102 may apply a synthesis window to the encoded input signal, remove aliasing generated during the MDCT operation through an overlap-add operation, and thereby may extract an output signal.

Figure 6:
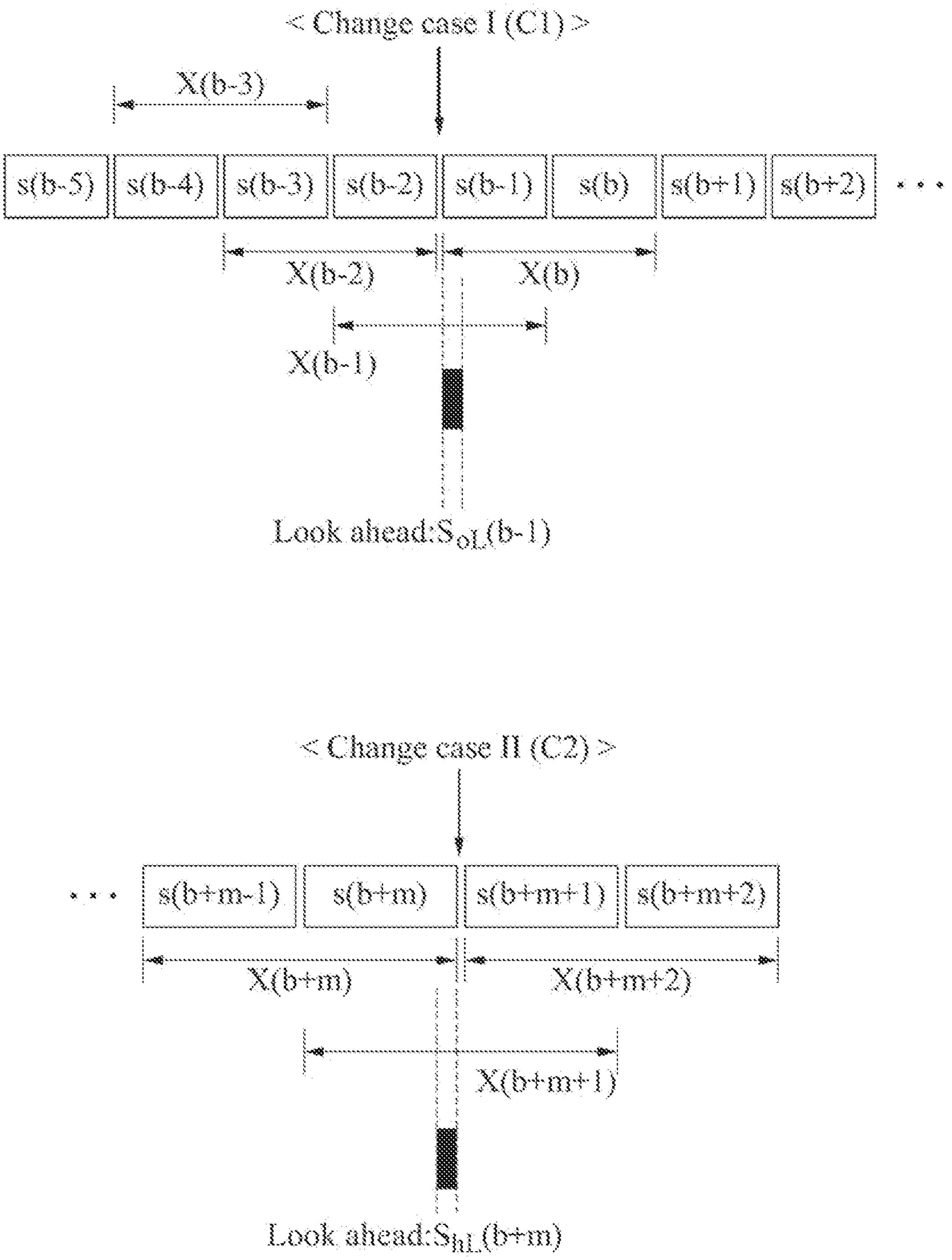
FIG. 6 is a diagram illustrating an encoding operation (C1, C2) according to an embodiment of the present invention.

FIG. 6 is a diagram illustrating an encoding operation (C1, C2) according to an embodiment of the present invention.

In FIG. 6, the C1 (Change case 1) and C2 (Change case 2) may denote a border of an input signal where an encoding scheme is applied. Sub-blocks, s(b−5), s(b−4), s(b−3), and s(b−2), located in a left side based on the C1 may denote a speech characteristic signal. Sub-blocks, s(b−1), s(b), s(b+11), and s(b+2), located in a right side based on the C1 may denote an audio characteristic signal. Also, sub-blocks, s(b+m−1) and s(b+m), located in a left side based on the C2 may denote an audio characteristic signal, and sub-blocks, s(b+m+1) and s(b÷m+2), located in a right side based on the C2 may denote a speech characteristic signal.

In FIG. 2, the speech characteristic signal may be encoded through the first encoding unit 204, the audio characteristic signal may be encoded through the second encoding unit 205, and thus switching may occur in the C1 and the C2. In this instance, switching may occur in a folding point between sub-blocks. Also, a characteristic of the input signal may be different based on the C1 and the C2, and thus different encoding schemes are applied, and a blocking artifact may occur.

In this instance, encoding is performed according to an MDCT-based coding scheme, the decoding apparatus 102 may remove the blocking artifact through an overlap-add operation using both a previous block and a current block. However, when switching occurs between the speech characteristic signal and the audio characteristic signal like the C1 and the C2, an MDCT-based overlap add-operation may not be performed. Additional information for MDCT-based decoding may be required. For example, additional information $S_{oL}(b-1)$ may be required in the C1, and additional information $S_{hL}(b+m)$ may be required in the C2. According to an embodiment of the present invention, an increase in a bit rate may be prevented, and a coding efficiency may be improved by minimizing the additional information $S_{oL}(b-1)$ and the additional information $S_{hL}(b+m)$.

When switching occurs between the speech characteristic signal and the audio characteristic signal, the encoding apparatus 101 may encode the additional information to restore the audio characteristic signal. In this instance, the additional information may be encoded by the first encoding unit 204 encoding the speech characteristic signal. Specifically, in the C1, an area corresponding to the additional information $S_{oL}(b-1)$ in the speech characteristic signal s(b−2) may be encoded as the additional information. Also, in the C2, an area corresponding to the additional information $S_{hL}(b+m)$ in the speech characteristic signal s(h+m+1) may be encoded as the additional information.

An encoding method when the C1 and the C2 occur is described in detail with reference to FIGS. 7 through 11, and a decoding method is described in detail with reference to FIGS. 15 through 18.

Figure 7:
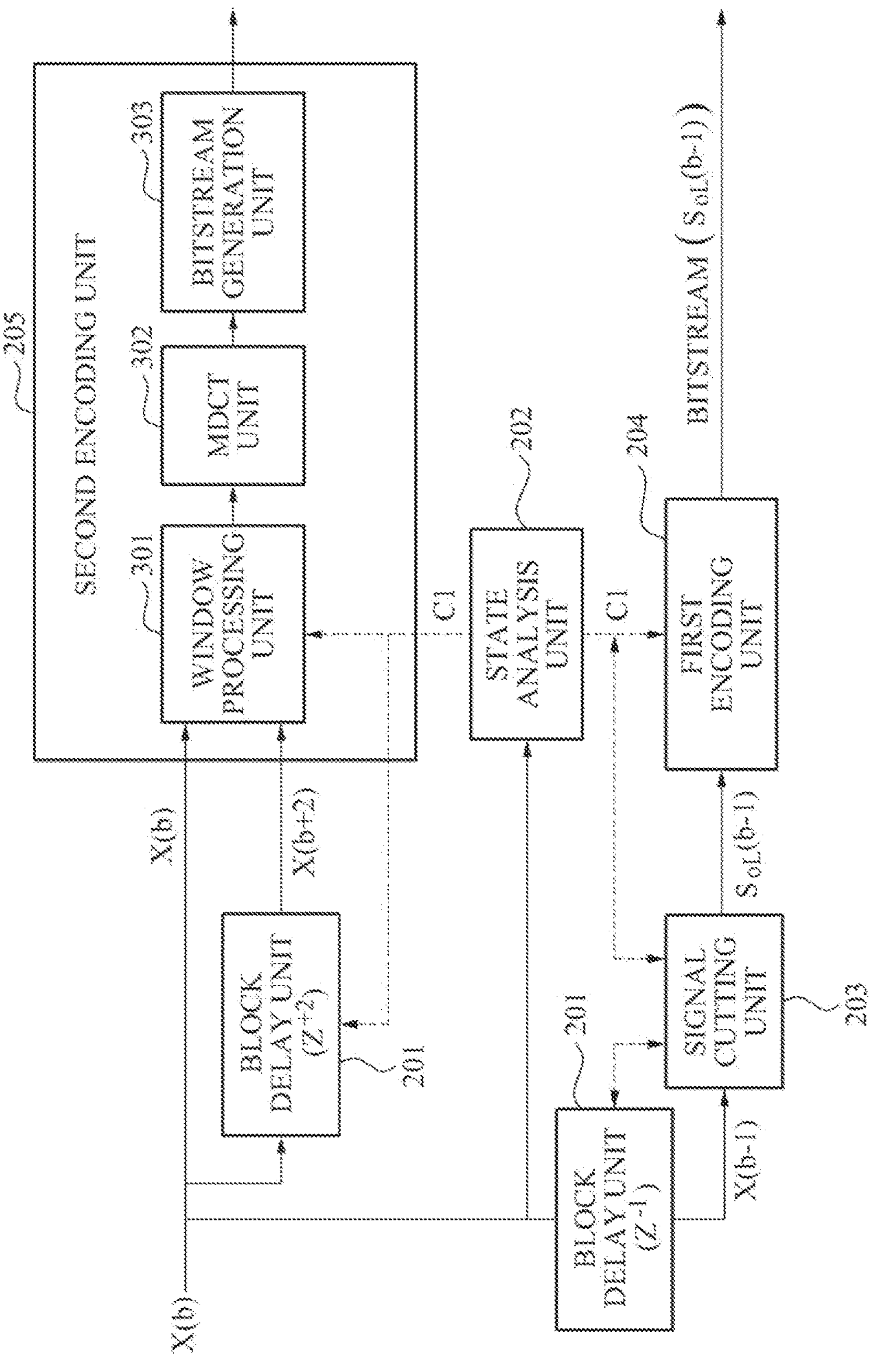
FIG. 7 is a diagram illustrating an operation of generating a bitstream in a C1 according to an embodiment of the present invention.

FIG. 7 is a diagram illustrating an operation of generating a bitstream in a C1 according to an embodiment of the present invention.

When a block X(b) of an input signal is inputted, the state analysis unit 202 may analyze a state of the corresponding block. In this instance, when the block X(b) is an audio characteristic signal and a block X(b–2) is a speech characteristic signal, the state analysis unit 202 may recognize that the C1 occurs in a folding point existing between the block X(b) and the block X(b–2). Accordingly, control information about the generation of the C1 may be transmitted to the block delay unit 201, the window processing unit 301, and the first encoding unit 204.

When the block X(b) of the input signal is inputted, the block X(b) and a block X(b+2) may be inputted to the window processing unit 301. The block X(b+2) may be delayed ahead (+2) through the block delay unit 201. Accordingly, an analysis window may be applied to the block X(b) and the block X(b+2) in the C1 of FIG. 6. Here, the block X(b) may include sub-blocks s(b–1) and s(b), and the block X(b+2) may include sub-blocks s(b+1) and s(b+2). An MDCT may be performed with respect to the block X(b) and the block X(b+2) where the analysis window is applied through the MDCT unit 302. A block where the MDCT is performed may be encoded through the bitstream generation unit 303, and thus a bitstream of the block X(b) of the input signal may be generated.

Also, to generate the additional information S0L(b–1) for an overlap-add operation with respect to the block X(b), the block delay unit 201 may extract a block X(b–1) by delaying back the block X(b). The block X(b–1) may include the sub-blocks s(b–2) and s(b–1). Also, the signal cutting unit 203 may extract the additional information $S_{oL.}$(b–1) from the block X(b–1) through signal cutting.

For example, the additional information $S_{oL}$(b–1) may be determined by, $$s_{oL}(b-1)=[s((b-2)\cdot N/4), \ldots ,s((b-2)\cdot N/4+oL-1)]^{T}\quad 0<oL\leq N/4 \qquad \text{[Equation 5]}$$

In this instance, N may denote a size of a block for MDCT.

The first encoding unit 204 may encode an area corresponding to the additional information of the speech characteristic signal for overlapping among blocks based on the folding point where switching occurs between the speech characteristic signal and the audio characteristic signal. For example, the first encoding unit 204 may encode the additional information $S_{oL}$(b–1) corresponding to an additional information area (oL) in the sub-block s(b–2) which is the speech characteristic signal. That is, the first encoding unit 204 may generate a bitstream of the additional information $S_{oL}$(b–1) by encoding the additional information $S_{oL}$(b–1) extracted by the signal cutting unit 203. That is, when the C1 occurs, the first encoding unit 204 may generate only the bitstream of the additional information $S_{oL}$(b–1). When the C1 occurs, the additional information $S_{oL}$(b–1) may be used as additional information to remove blocking artifact.

For another example, when the additional information $S_{oL}$(b–1) may be obtained when the block X(b–1) is encoded, the first encoding unit 204 may not encode the additional information $S_{oL}$(b–1).

Figure 8:
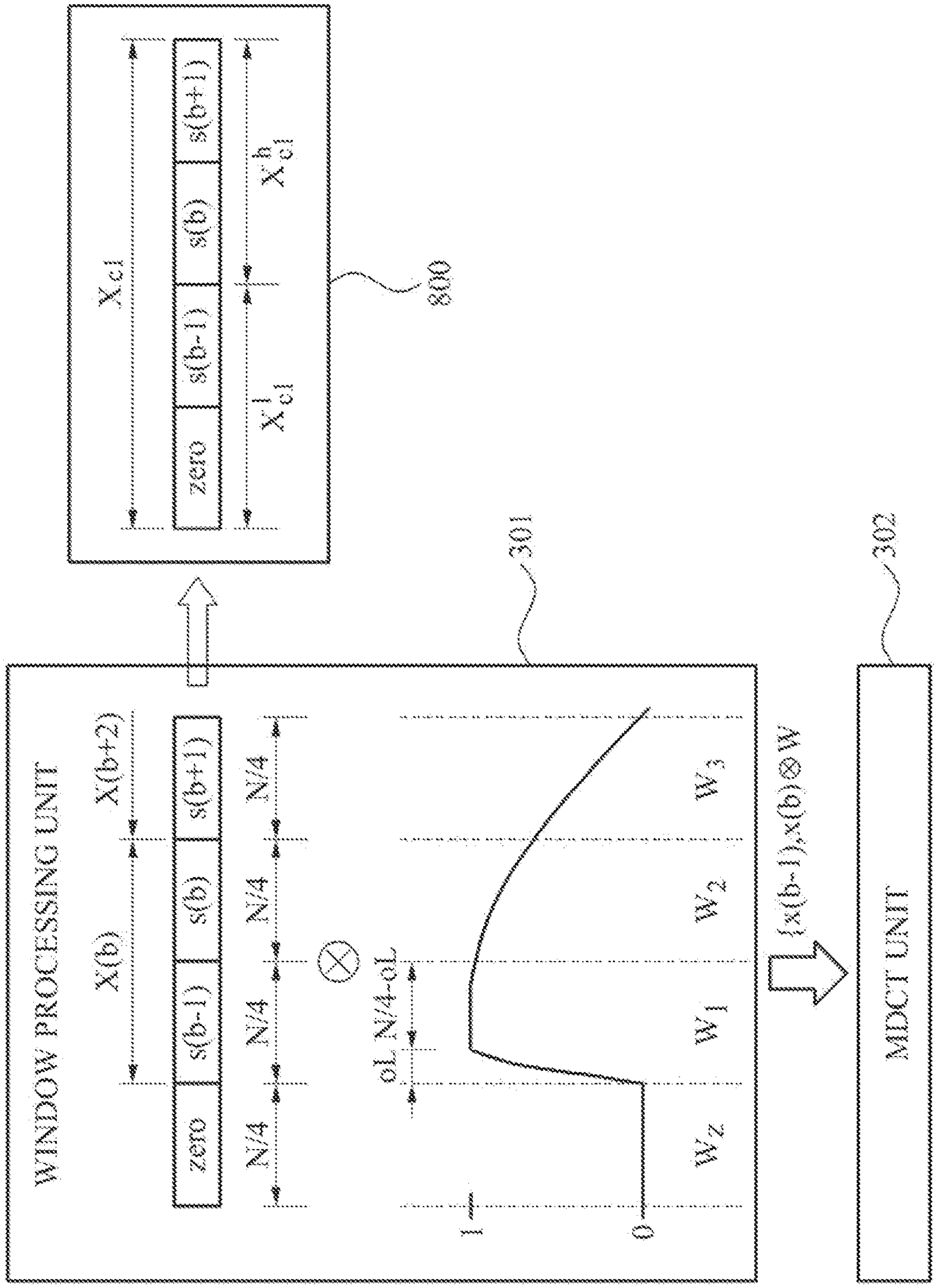
FIG. 8 is a diagram illustrating an operation of encoding an input signal through window processing in a C1 according to an embodiment of the present invention.

FIG. 8 is a diagram illustrating an operation of encoding an input signal through window processing in the C1 according to an embodiment of the present invention.

In FIG. 8, a folding point may be located between a zero sub-block and the sub-block s(b–1) with respect to the C1. The zero sub-block may be the speech characteristic signal, and the sub-block s(b–1) may be the audio characteristic signal. Also, the folding point may be a folding point where switching occurs to the audio characteristic signal from the speech characteristic signal. As illustrated in FIG. 8, when the block X(b) is inputted, the window processing unit 301 may apply an analysis window to the block X(b) and block X(b+2) which are the audio characteristic signal. As illustrated in FIG. 8, when the folding point where switching occurs between the speech characteristic signal and the audio characteristic signal in a current frame of an input signal, the window processing unit 301 may perform encoding by applying the analysis window which does not exceed the folding point to the current frame.

For example, the window processing unit 301 may apply the analysis window. The analysis window may be configured as a window which has a value of 0 and corresponds to a first sub-block, a window corresponding to an additional information area of a second sub-block, and a window which has a value of 1 and corresponds to a remaining area of the second sub-block based on the folding point. The first sub-block may indicate the speech characteristic signal, and the second sub-block may indicate the audio characteristic signal.

In FIG. 8, the folding point may be located at a point of N/4 in the current frame configured as sub-blocks having a size of N/4.

In FIG. 8, the analysis window may include window $w_2$ corresponding to the zero sub-block which is the speech characteristic signal and window $W_1$ which comprises window corresponding to the additional information area (oL) of the S(b–1) sub-block which is the audio characteristic signal, and window corresponding to the remaining area (N/4-oL) of the S(b–1) sub-block which is the audio characteristic signal.

In this instance, the window processing unit 301 may substitute the analysis window $w_2$ for a value of zero with respect to the zero sub-block which is the speech characteristic signal. Also, the window processing unit 301 may determine an analysis window $\hat{w}_2$ corresponding to the sub-block s(b–1) which is the audio characteristic signal according to Equation 6.

$$\hat{w}_2 = [w_{oL}, w_{ones}]^T \qquad \text{[Equation 6]}$$

$$w_{oL} = [w_{oL}(0), \ldots , w_{oL}(oL-1)]^T$$

$$w_{ones}^{N/4-oL} = [\underbrace{1, \ldots , 1}_{N/4-oL}]^T$$

That is, the analysis window $\hat{w}_2$ applied to the sub-block s(b-–1) may include an additional information area (oL) and a remaining area (N/4-oL) of the additional information area (oL) In this instance, the remaining area may be configured as 1.

In this instance, $w_{oL}$ may denote a first half of a sine-window having a size of 2×oL. The additional information area (oL) may denote a size for an overlap-add operation among blocks in the C1, and determine a size of each of $w_{oL}$ and $s_{oL}$(b–1). Also, a block sample may be defined $x_{c1}=[X_{c1}^{1}, X_{c1}^{h}]^{T}$ for following description in a block sample 800.

For example, the first encoding unit 204 may encode a portion corresponding to the additional information area in a sub-block, which is a speech characteristic signal, for overlapping among blocks based on the folding point. In FIG. 8, the first encoding unit 204 may encode a portion corresponding to the additional information area (oL) in the zero sub-block s(b–2). As described above, the first encoding unit 204 may encode the portion corresponding to the additional information area according to the MIXI-based coding scheme and the different coding scheme.

As illustrated in FIG. 8, the window processing unit 301 may apply a sine-shaped analysis window to an input signal. However, when the C1 occurs, the window processing unit 301 may set an analysis window, corresponding to a sub-block located ahead of the folding point, as zero. Also, the window processing unit 301 may set an analysis window, corresponding to the sub-block s(b−1) located behind the C1 folding point, to be configured as an analysis window corresponding to the additional information area (oL) and a remaining analysis window. Here, the remaining analysis window may have a value of 1. The MDCT unit 302 may perform an MDCT with respect to an input signal {X(b−1), X(b)}$\otimes W_{analysis}$ is where the analysis window illustrated in FIG. 8 is applied.

Figure 9:
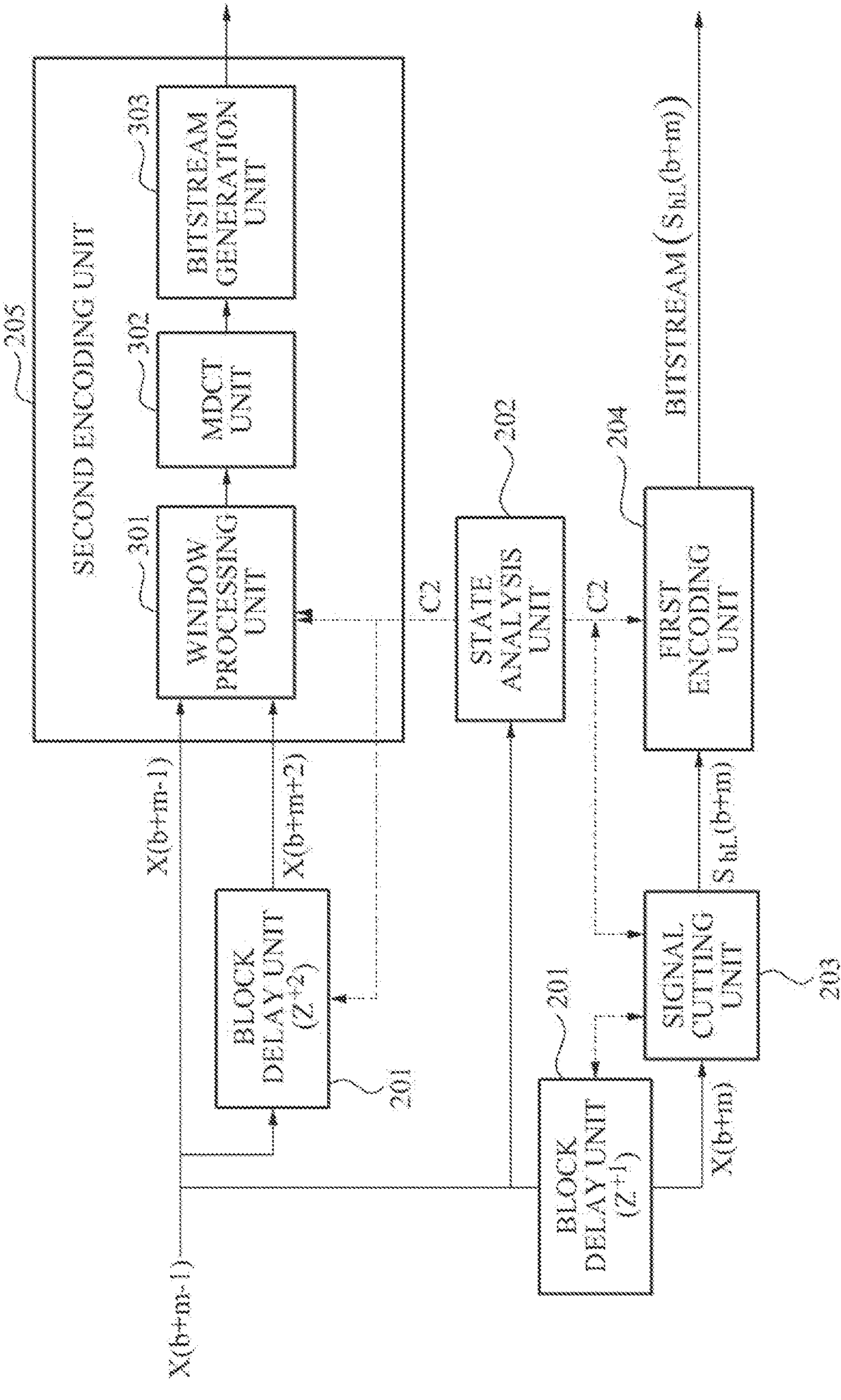
FIG. 9 is a diagram illustrating an operation of generating a bitstream in a C2 according to an embodiment of the present invention.

FIG. 9 is a diagram illustrating an operation of generating a bitstream in the C2 according to an embodiment of the present invention.

When a block X(b) of an input signal is inputted, the state analysis unit 202 may analyze a state of a corresponding block. As illustrated in FIG. 6, when the sub-block s(b+m) is an audio characteristic signal and a sub-block s(b+m+1) is a speech characteristic signal, the state analysis unit 202 may recognize that the C2 occurs. Accordingly, control information about the generation of the C2 may be transmitted to the block delay unit 201, the window processing unit 301, and the first encoding unit 204.

When a block X(b+m−1) of the input signal is inputted, the block X(b+m−1) and a block X(b+m+1), which is delayed ahead (+2) through the block delay unit 201, may be inputted to the window processing unit 301. Accordingly, the analysis window may be applied to the block X(b+m+1) and the block X(b+m−1) in the C2 of FIG. 6. Here, the block X(b+m+1) may include sub-blocks s(b+m−1) and s(b+m), and the block X(b+m−1) may include sub-blocks s(b+m−2) and s(b+m−1).

For example, when the C2 occurs in the folding point between the speech characteristic signal and an the audio characteristic signal in a current frame of the input signal, the window processing unit 301 may apply the analysis window, which does not exceed the folding point, to the audio characteristic signal.

An MDCT may be performed with respect to the blocks X(b+m+1) and X(b+m−1) where the analysis window is applied through the MDCT unit 302. A block where the MDCT is performed may be encoded through the bitstream generation unit 303, and thus a bitstream of the block X(b+m−1) of the input signal may be generated.

Also, to generate the additional information $S_{hL}$(b+m) for an overlap-add operation with respect to the block X(b+m−1), the block delay unit 201 may extract a block X(b+m) by delaying ahead (+1) the block X(b+m−1). The block X(b+m) may include the sub-blocks s(b+m−1) and s(b+m). Also, the signal cutting unit 203 may extract only the additional information $S_{hL}$(b+m) through signal cutting with respect to the block X(b+m).

For example, the additional information $S_{hL}$(b+m) may be determined by, $$s_{hL}(b+m)=[s((b+m-1)\cdot N/4), \ldots, s((b+m-1)\cdot N/4+hL-1)]^T \quad 0<hL\leq N/4 \qquad \text{[Equation 7]}$$

In this instance, N may denote a size of a block for MDCT.

The first encoding unit 204 may encode the additional information $S_{hL}$(b+m) and generate a bitstream of the additional information $S_{hL}$(b+m). That is, when the C2 occurs, the first encoding unit 204 may generate only the bitstream of the additional information $S_{hL}$(b+m), When the C2 occurs, the additional information $S_{hL}$(b+m) may be used as additional information to remove a blocking artifact.

Figure 10:
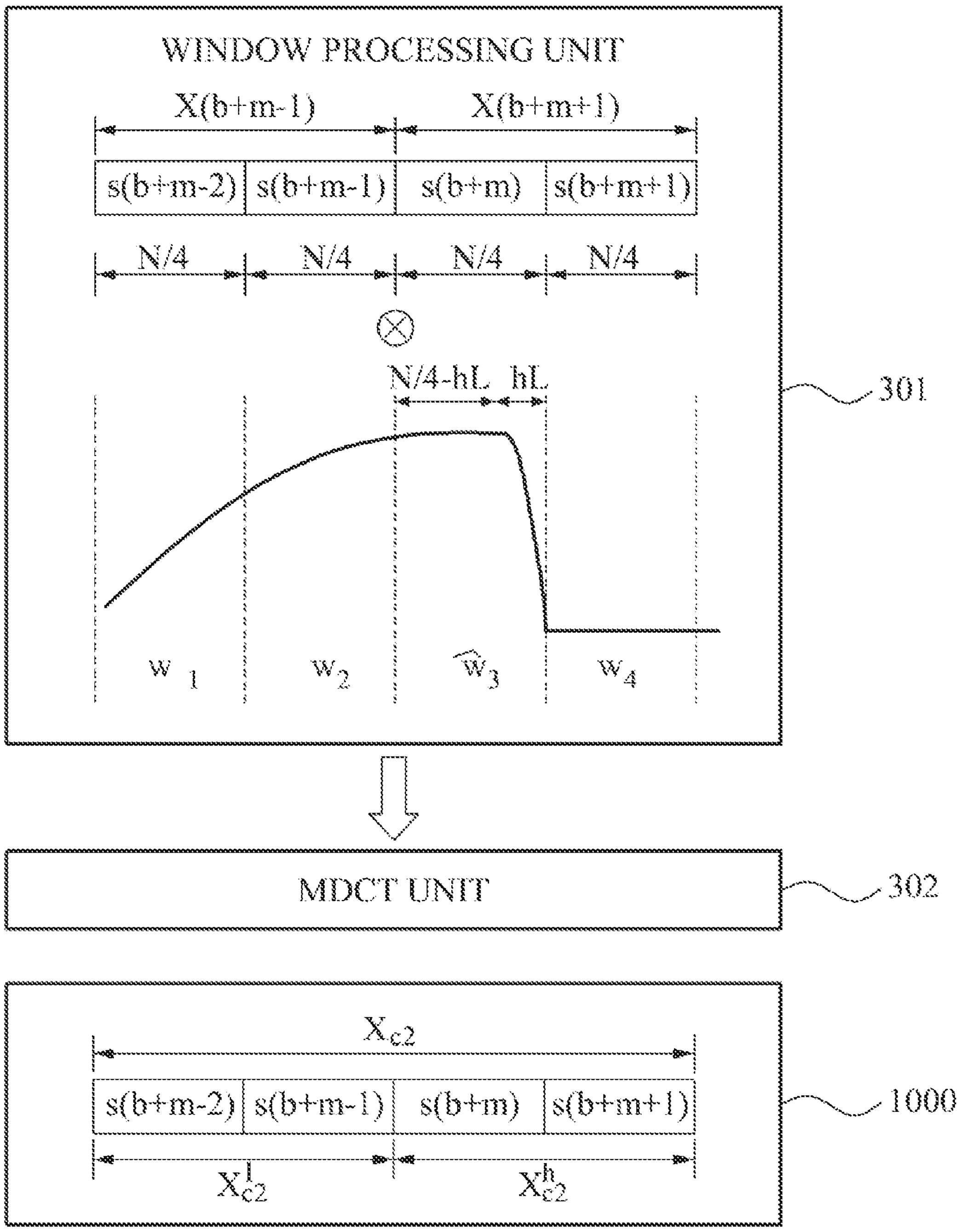
FIG. 10 is a diagram illustrating an operation of encoding an input signal through window processing in a C2 according to an embodiment of the present invention.

FIG. 10 is a diagram illustrating an operation of encoding an input signal through window processing in the C2 according to an embodiment of the present invention.

In FIG. 10, a folding point may be located between the sub-block s(b+m) and the sub-block s(b+m+1) with respect to the C2. Also, the folding point may be a folding point where the audio characteristic signal switches to the speech characteristic signal, That is, when a current frame illustrated in FIG. 10 may include sub-blocks having a size of N/4, the folding point may be located at a point of 3N/4.

For example, when a folding point where switching occurs exists between the audio characteristic signal and the speech characteristic signal in the current frame of the input signal, the window processing unit 301 may apply an analysis window which does not exceed the folding point to the audio characteristic signal. That is, the window processing unit 301 may apply the analysis window to the sub-block s(b+m) of the block X(b+m+1) and X(b+m−1).

Also, the window processing unit 301 may apply the analysis window. The analysis window may be configured as a window which has a value of 0 and corresponds to a first sub-block, a window corresponding to an additional information area of a second sub-block, and a window which has a value of 1 and corresponds to a remaining area of the second sub-block based on the folding point. The first sub-block may indicate the speech characteristic signal, and the second sub-block may indicate the audio characteristic signal. In FIG. 10, the folding point may be located at a point of 3N/4 in the current frame configured as sub-blocks having a size of N/4.

That is, the window processing unit 301 may substitute the analysis window $w_z$ for a value of zero. Here, the analysis window may correspond to the sub-block s(b+m+1) which is the speech characteristic signal. Also, the window processing unit 301 may determine an analysis window $\hat{w}_3$ corresponding to the sub-block s(b+m) which is the audio characteristic signal according to Equation 8.

$$w_3 = [w_{ones}, w_{hL}]^T \qquad \text{[Equation 8]}$$

$$w_{hL} = [w_{hL}(0), \ldots, w_{hL}(hL-1)]^T$$

$$w_{ones}^{N/4-hL} = [\underbrace{1, \ldots, 1}_{N/4-hL}]^T$$

That is, the analysis window $\hat{w}_3$, applied to the sub-block s(b+m) indicating the audio characteristic signal based on the folding point, may include an additional information area (hL) and a remaining area (N/4-hL) of the additional information area. (hL). In this instance, the remaining area may be configured as 1.

In this instance, $w_{hL}$ may denote a second half of a sine-window having a size of 2×hL. An additional information area (hL) may denote a size for an overlap-add operation among blocks in the C2, and determine a size of each of $w_{hL}$ and $s_{hL}$(b+m). Also, a block sample $X_{c2}=[X_{c2}^{\,i}, X_{c2}^{\,h}]$ may be defined for following description in a block sample 1000.

For example, the first encoding unit 204 may encode a portion corresponding to the additional information area in a sub-block, which is a speech characteristic signal, for overlapping among blocks based on the folding point. In FIG. 10, the first encoding unit 204 may encode a portion corresponding to the additional information area (hL) in the zero sub-block s(b+m+1). As described above, the first encoding unit 204 may encode the portion corresponding to the additional information area according to the MDCT-based coding scheme and the different coding scheme.

As illustrated in FIG. 10, the window processing unit 301 may apply a sine-shaped analysis window to an input signal. However, when the C2 occurs, the window processing unit 301 may set an analysis window, corresponding to a sub-block located behind the folding point, as zero. Also, the window processing unit 301 may set an analysis window, corresponding to the sub-block s(b+m) located ahead of the folding point, to be configured as an analysis window corresponding to the additional information area (hL) and a remaining analysis window. Here, the remaining analysis window may have a value of 1. The MDCT unit 302 may perform an IVIDCT with respect to an input signal {X(b+m−1), X(b+m+1)}⊗W where the analysis window illustrated in FIG. 10 is applied.

Figure 11:
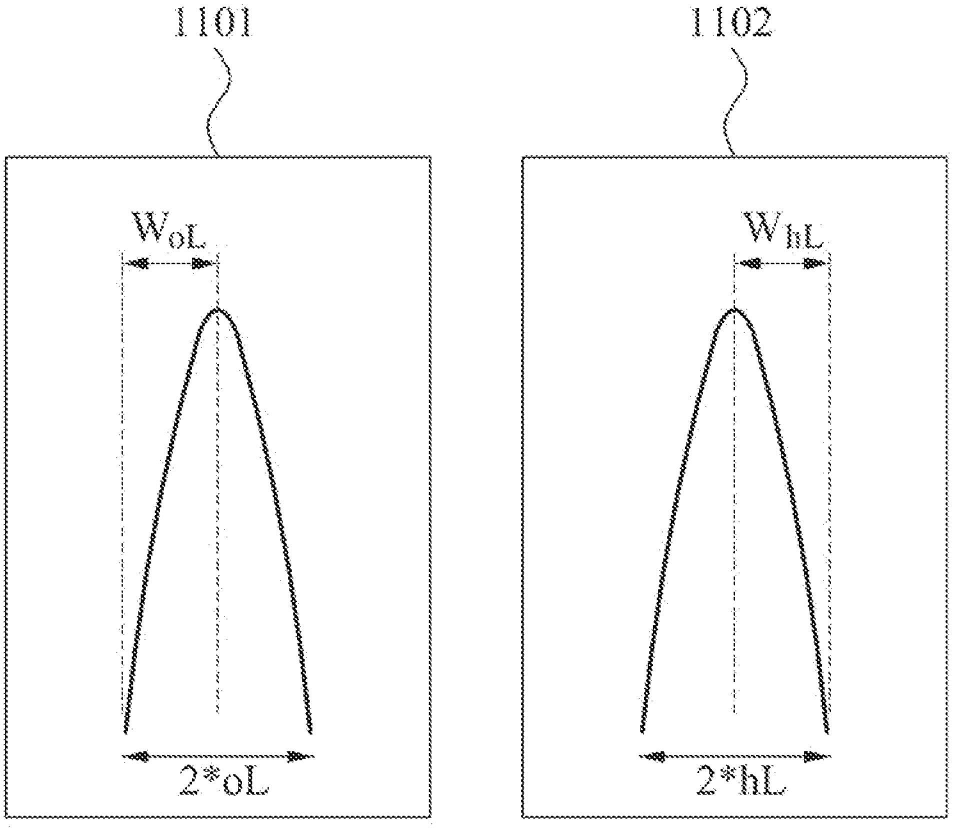
FIG. 11 is a diagram illustrating additional information applied when an input signal is encoded according to an embodiment of the present invention.

FIG. 11 is a diagram illustrating additional information applied when an input signal is encoded according to an embodiment of the present invention.

Additional information 1101 may correspond to a portion of a sub-block indicating a speech characteristic signal based on a folding point C1, and additional information 1102 may correspond to a portion of a sub-block indicating a speech characteristic signal based on a folding point C2, In this instance, a sub-block corresponding to an audio characteristic signal behind the C1 folding point may be applied to a synthesis window where a first half (oL) of the additional information 1101 is reflected. A remaining area (N/4-oL) may be substituted for 1. Also, a sub-block, corresponding to an audio characteristic signal ahead of the C2 folding point, may be applied to a synthesis window where a second half (hL) of the additional information 1102 is reflected. A remaining area (N/4hL) may be substituted for FIG. 12 is a block diagram illustrating a configuration of a decoding apparatus 102 according to an embodiment of the present invention.

Figure 12:
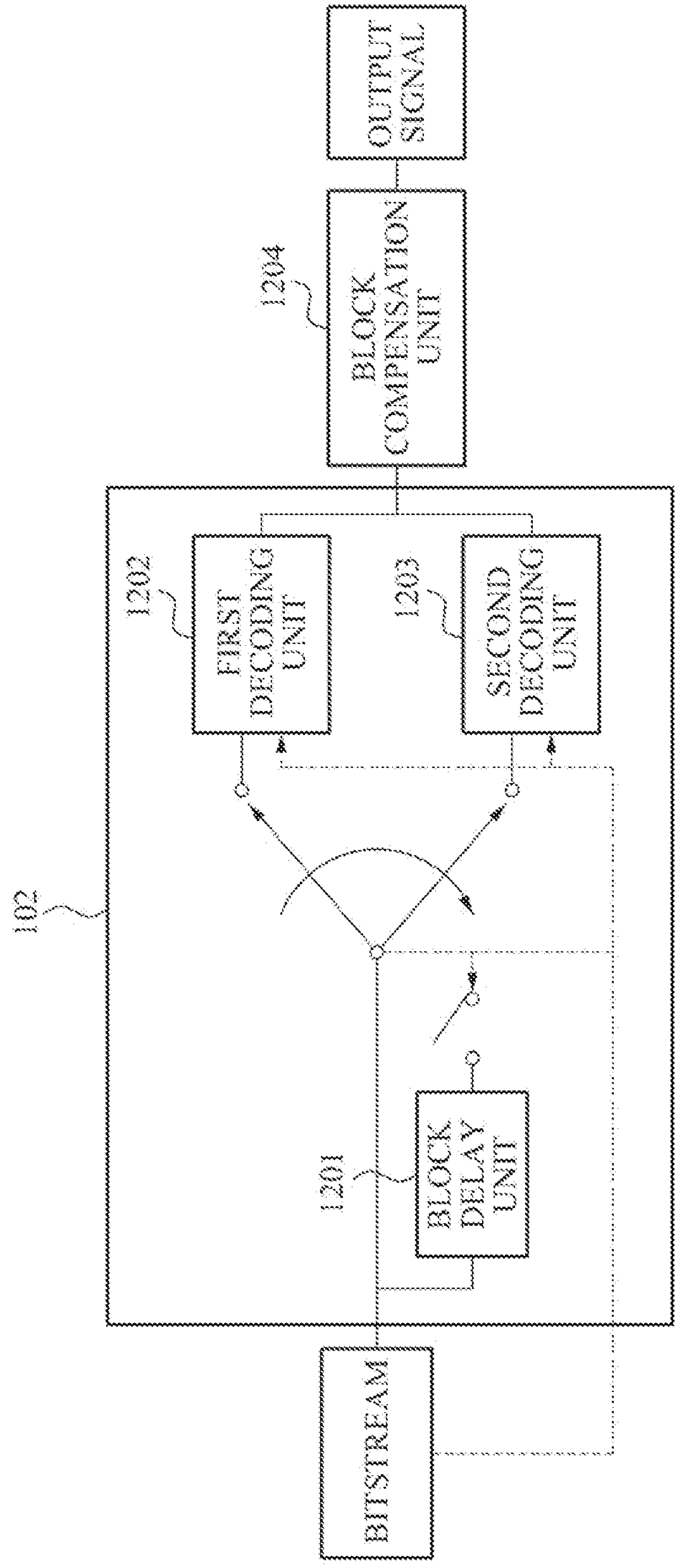
FIG. 12 is a block diagram illustrating a configuration of a decoding apparatus according to an embodiment of the present invention.

Referring to FIG. 12, the decoding apparatus 102 may include a block delay unit 1201, a first decoding unit 1202, a second decoding unit 1203, and a block compensation unit 1204.

The block delay unit 1201 may delay back or ahead a block according to a control parameter (C1 and C2) included in an inputted bitstream.

Also, the decoding apparatus 102 may switch a decoding scheme depending on the control parameter of the inputted bitstream to enable any one of the first decoding unit 1202 and the second decoding unit 1203 to decode the bitstream. In this instance, the first decoding unit 1202 may decode an encoded speech characteristic signal, and the second decoding unit 1203 may decode an encoded audio characteristic signal. For example, the first decoding unit 1202 may decode the audio characteristic signal according to a CELP-based coding scheme, and the second decoding unit 1203 may decode the speech characteristic signal according to an MDCT-based coding scheme.

A result of decoding through the first decoding unit 1202 and the second decoding unit 1203 may be extracted as a final output signal through the block compensation unit 1204.

The block compensation unit 1204 may perform block compensation with respect to the result of the first decoding unit 1202 and the result of the second decoding unit 1203 to restore the input signal. For example, when a folding point where switching occurs between the speech characteristic signal and the audio characteristic signal exists in a current frame of the input signal, the block compensation unit 1204 may apply a synthesis window which does not exceed the folding point.

In this instance, the block compensation unit 1204 may apply a first synthesis window to additional information, and apply a second synthesis window to the current frame to perform an overlap-add operation. Here, the additional information may be extracted by the first decoding unit 1202, and the current frame may be extracted by the second decoding unit 1203. The block compensation unit 1204 may apply the second synthesis window to the current frame. The second synthesis window may be configured as a window which has a value of 0 and corresponds to a first sub-block, a window corresponding to an additional information area of a second sub-block, and a window which has a value of 1 and corresponds to a remaining area of the second sub-block based on the folding point. The first sub-block may indicate the speech characteristic signal, and the second sub-block may indicate the audio characteristic signal. The block compensation unit 1204 is described in detail with reference to FIGS. 16 through 18.

Figure 13:
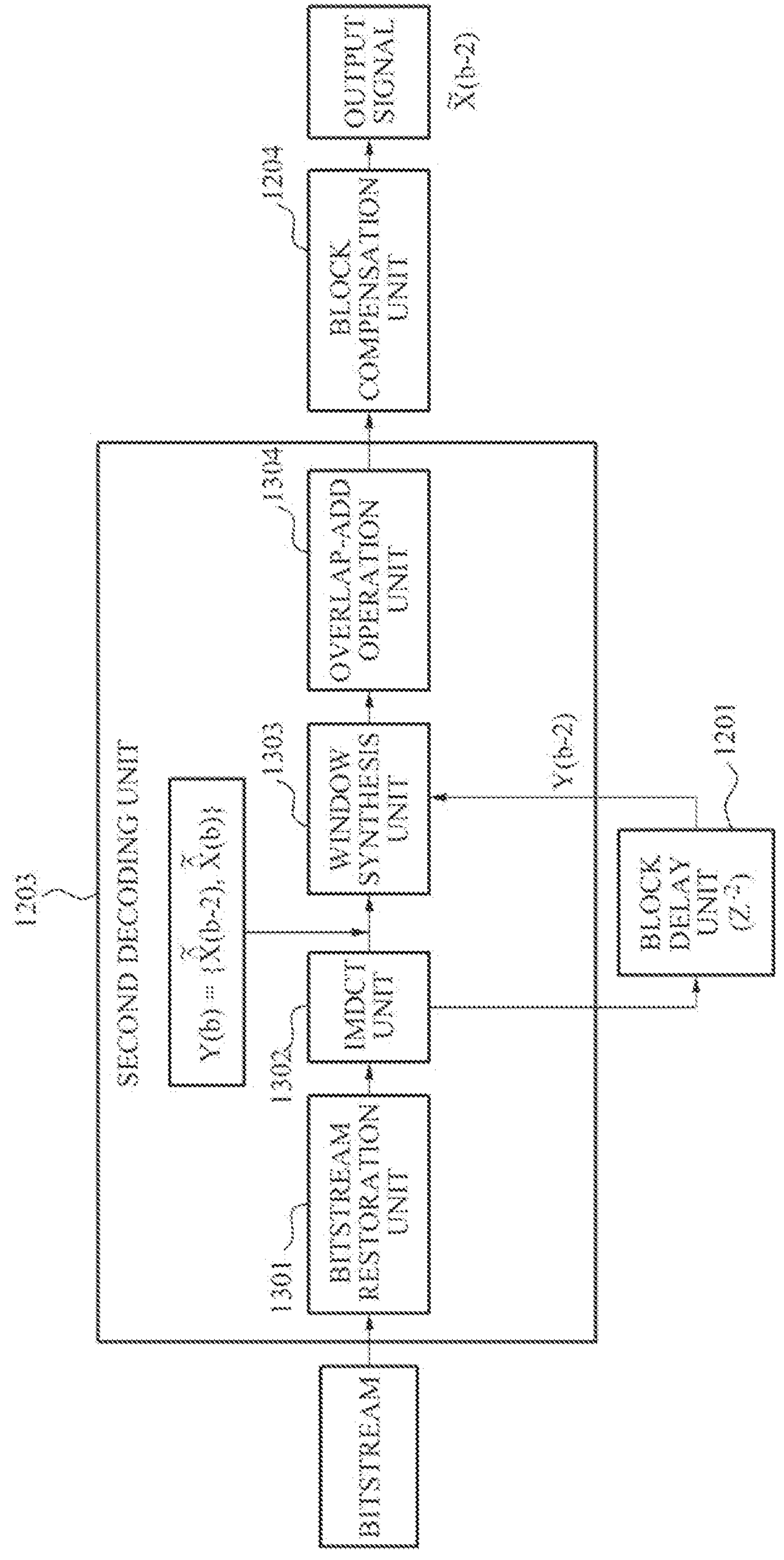
FIG. 13 is a diagram illustrating an operation of decoding a bitstream through a second decoding unit according to an embodiment of the present invention.

FIG. 13 is a diagram illustrating an operation of decoding a bitstream through a second decoding unit 1303 according to an embodiment of the present invention.

Referring to FIG. 13, the second decoding unit 1203 may include a bitstream restoration unit 1301, an INIDCT unit 1302, a window synthesis unit 1303, and an overlap-add operation unit 1304.

The bitstream restoration unit 1301 may decode an inputted bitstream. Also, the IMDCT unit 1302 may transform a decoded signal to a sample in a time domain through an IMDCT.

A block Y(b), transformed through the IMDCT unit 1302, may be delayed back through the block delay unit 1201 and inputted to the window processing unit 1303. Also, the block Y(b) may be directly inputted to the window processing unit 1303 without the delay. In this instance, the block Y(b) may have a value of $Y(b)=[\hat{X}(b-2), \hat{X}(b)]^T$. In this instance, the block Y(b) may be a current block inputted through the second encoding unit 205 in FIG. 3.

The window synthesis unit 1303 may apply the synthesis window to the inputted block Y(b) and a delayed block Y(b−2). When the C1 and C2 do not occur, the window synthesis unit 1303 may identically apply the synthesis window to the blocks Y(b) and Y(b−2).

For example, the window synthesis unit 1303 may apply the synthesis window to the block Y(b) according to Equation 9.

$$[\tilde{\hat{X}}(b-2),\tilde{\hat{X}}(b)]^T \otimes W_{synthesis}=[s((b-2)N/4)\cdot w_1(0), \ldots ,s((b-1)N/4+N/4-1)\cdot w_4(N/4-1)]^T \qquad \text{[Equation 9]}$$

In this instance, the synthesis window $W_{systhesis}$ may be identical to an analysis window $W_{analysis}$.

The overlap-add operation unit 1304 may perform a 50% overlap-add operation with respect to a result of applying the synthesis window to the blocks Y(b) and Y(b−2). A result $\tilde{X}(b-2)$ obtained by the overlap-add operation unit 1304 may be given by, $$\tilde{X}(b-2)=([\tilde{\hat{X}}(b-2)]^T \otimes [w_1,w_2]^T) \oplus ([_p \tilde{\hat{X}}(b-2)]^T \otimes [w_3,w_4]^T) \qquad \text{[Equation 10]}$$

In this instance, $[\tilde{\hat{X}}(b-2)]^T$ and $_p[\tilde{\hat{X}}(b-2)]^T$ may be associated with the block Y(b) and the block Y(b−2), respectively. Referring to Equation 10, $\tilde{X}(b-2)$ may be obtained by performing an overlap-add operation with respect to a result of combining $[\tilde{\tilde{X}}(b-2)]^T$ and a first half $[w_1,w_2]^T$ of the synthesis window, and a result of combining $_p[\tilde{\tilde{X}}(b-2)]^T$ and a second half $[w_3, w_4,]^T$ of the synthesis window FIG. 14 is a diagram illustrating an operation of extracting an output signal through an overlap-add operation according to an embodiment of the present invention.

Figure 14:
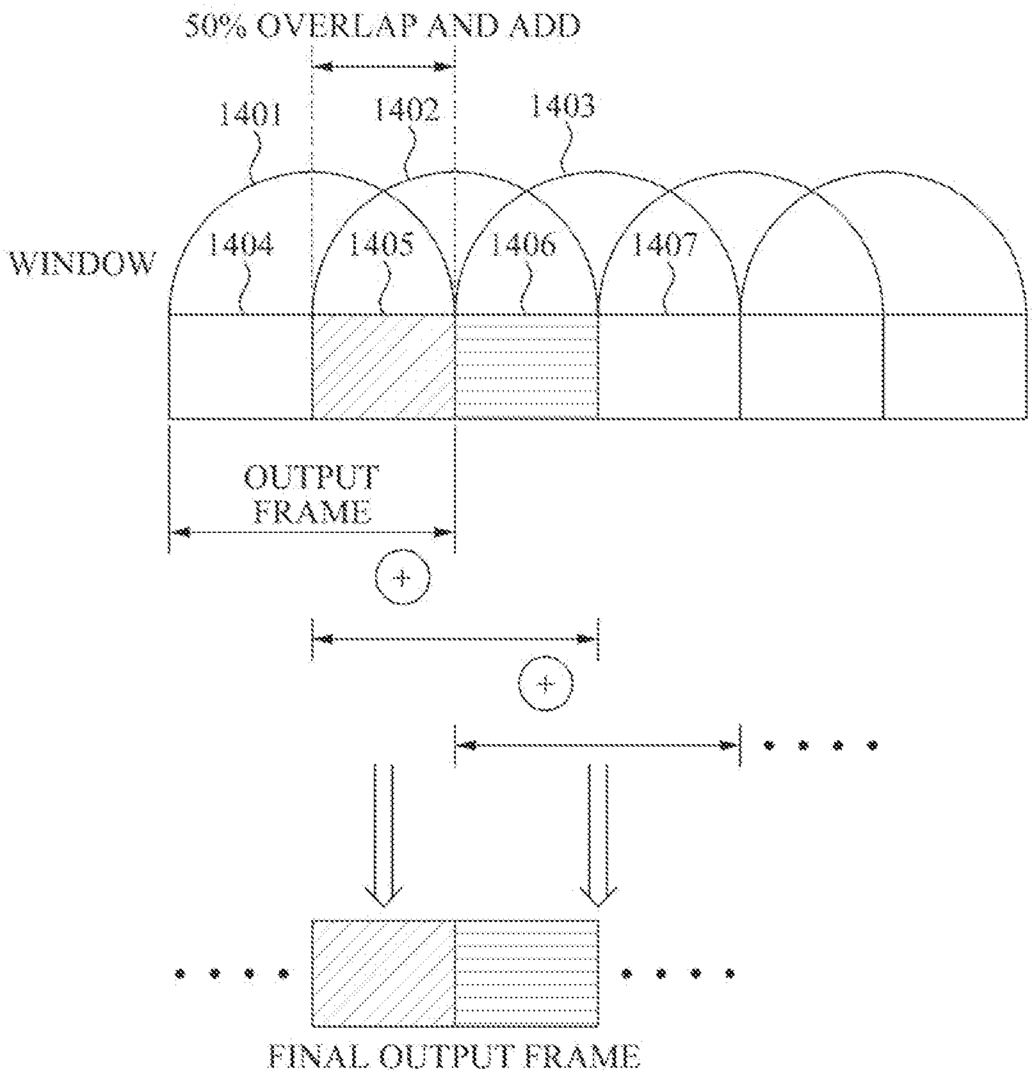
FIG. 14 is a diagram illustrating an operation of extracting an output signal through an overlap-add operation according to an embodiment of the present invention.

Windows 1401, 1402, and 1403 illustrated in FIG. 14 may indicate a synthesis window. The overlap-add operation unit 1304 may perform an overlap-add operation with respect to blocks 1405 and 1406 where the synthesis window 1402 is applied, and with respect to blocks 1404 and 1405 where the synthesis window 1401 is applied, and thereby may output a block 1405. Identically, the overlap-add operation unit 1304 may perform an overlap-add operation with respect to the blocks 1405 and 1406 where the synthesis window 1402 is applied, and with respect to the blocks 1406 and 1407 where the synthesis window 1403 is applied, and thereby may output the block 1406.

That is, referring to FIG. 14, the overlap-add operation unit 1304 may perform an overlap-add operation with respect to a current block and a delayed previous block, and thereby may extract a sub-block included in the current block. In this instance, each block may indicate an audio characteristic signal associated with an MDCT.

However, when the block 1404 is the speech characteristic signal and the block 1405 is the audio characteristic signal, that is, when the C1 occurs, an overlap-add operation may not be performed since MDCT information is not included in the block 1404. In this instance, MDCT additional information of the block 1404 may be required for the overlap-add operation. Conversely, when the block 1404 is the audio characteristic signal and the block 1405 is the speech characteristic signal, that is, when the C2 occurs, an overlap-add operation may not be performed since the MDCT information is not included in the block 1405. In this instance, the MDCT additional information of the block 1405 may be required for the overlap-add operation.

Figure 15:
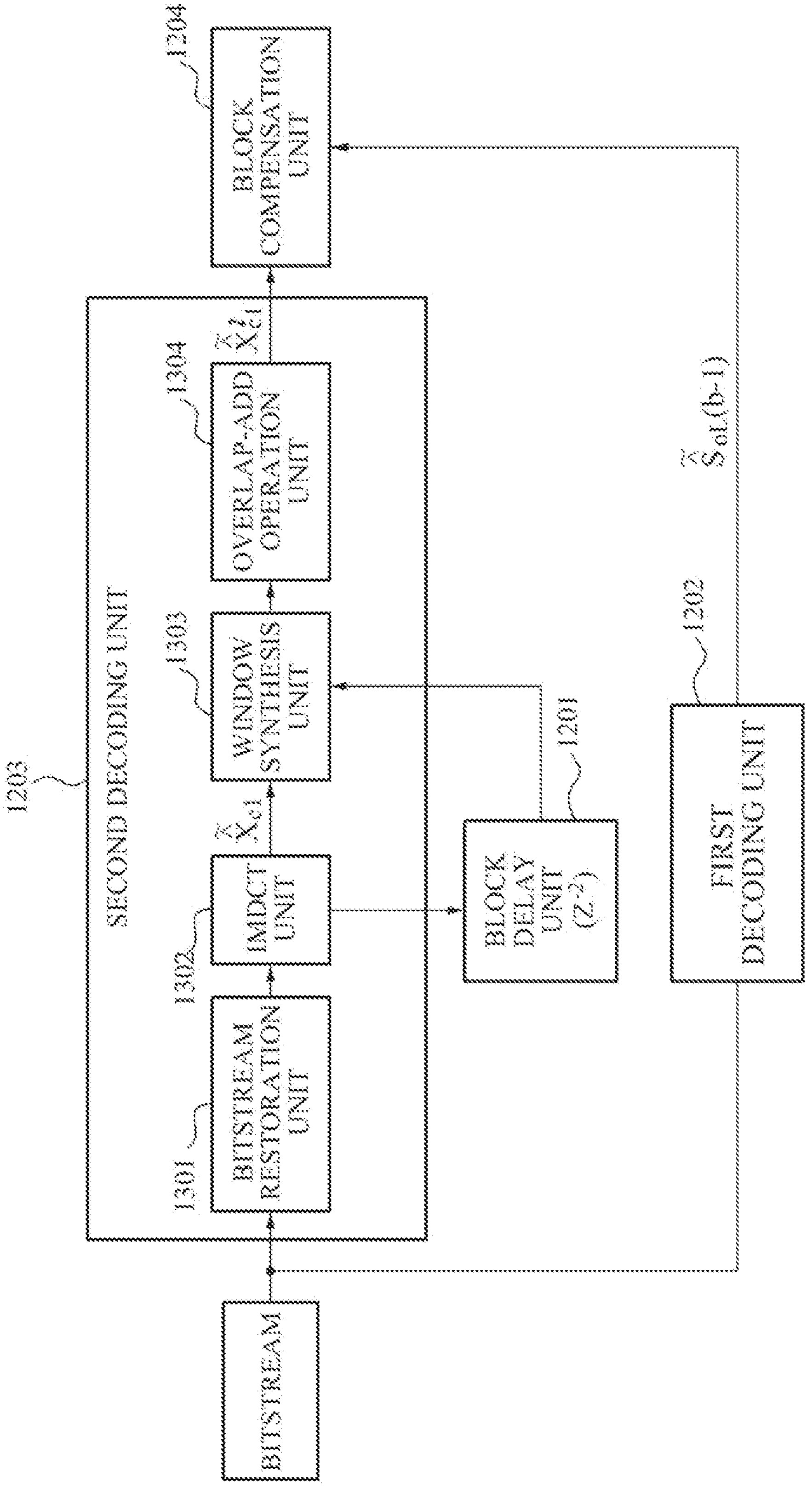
FIG. 15 is a diagram illustrating an operation of generating an output signal in a C1 according to an embodiment of the present invention.

FIG. 15 is a diagram illustrating an operation of generating an output signal in the C1 according to an embodiment of the present invention. That is, FIG. 15 illustrates an operation of decoding the input signal encoded in FIG. 7.

The C1 may denote a folding point where the audio characteristic signal is generated after the speech characteristic signal in the current frame 800. In this instance, the folding point may be located at a point of N/4 in the current frame 800.

The bitstream restoration unit 1301 may decode the inputted bitstream. Sequentially, the IMDCT unit 1302 may perform an IMDCT with respect to a result of the decoding. The window synthesis unit 1303 may apply the synthesis window to a block $\tilde{\tilde{X}}_{c1}{}^h$ in the current frame 800 of the input signal encoded by the second encoding unit 205. That is, the second decoding unit 1203 may decode a block s(b) and a block s(b+1) which are not adjacent to the folding point in the current frame 800 of the input signal.

In this instance, different from FIG. 13, a result of the IMDCT may not pass the block delay unit 1201 in FIG. 15.

The result of applying the synthesis window to the block $\tilde{\tilde{X}}_{c1}{}^h$ may be given by, $$\tilde{X}_{c1}{}^h=\tilde{\tilde{X}}_{c1}{}^h\otimes[w_3,w_4]^T \qquad \text{[Equation 11]}$$

The block $\tilde{\tilde{X}}_{c1}{}^h$ may be used as a block signal for overlap with respect to the current frame 800.

Only input signal corresponding to the block $\tilde{\tilde{X}}_{c1}{}^h$ in the current frame 800 may be restored by the second decoding unit 1203. Accordingly, since only block $\tilde{\tilde{X}}_{c1}{}^l$ may exist in the current frame 800, the overlap-add operation unit 1304 may restore an input signal corresponding to the block $\tilde{\tilde{X}}_{c1}{}^i$ where the overlap-add operation is not performed. The block $\tilde{\tilde{X}}_{c1}{}^l$ may be a block where the synthesis window is not applied by the second decoding unit 1203 in the current frame 800. Also, the first decoding unit 1202 may decode additional information included in a bitstream, and thereby may output a sub-block $\tilde{\tilde{s}}_{oL}(b-1)$.

The block $\tilde{\tilde{X}}_{c1}{}^l$, extracted by the second decoding unit 1203, and the sub-block $\tilde{\tilde{s}}_{oL}(b-1)$, extracted by the first decoding unit 1202, may be inputted to the block compensation unit 1204. A final output signal may be generated by the block compensation unit 1204.

Figure 16:
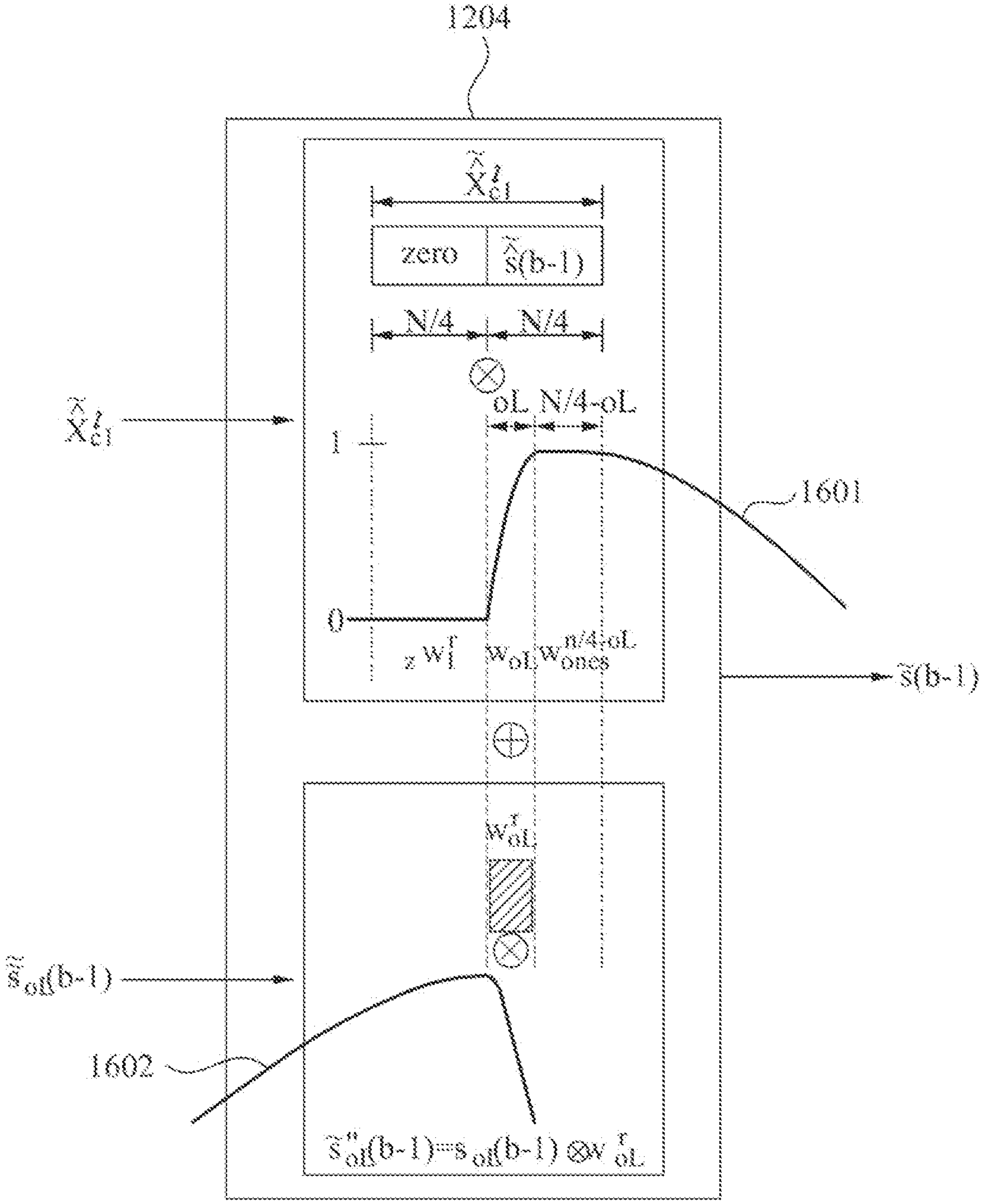
FIG. 16 is a diagram illustrating a block compensation operation in a C1 according to an embodiment of the present invention.

FIG. 16 is a diagram illustrating a block compensation operation in the C1 according to an embodiment of the present invention.

The block compensation unit 1204 may perform block compensation with respect to the result of the first decoding unit 1202 and the result of the second decoding unit 1203, and thereby may restore the input signal. For example, when a folding point where switching occurs between a speech characteristic signal and an audio characteristic signal exists in a current frame of the input signal, the block compensation unit 1204 may apply a synthesis window which does not exceed the folding point.

In FIG. 15, additional information, that is, the sub-block $\tilde{\tilde{s}}_{oL}(b-1)$ may be extracted by the first decoding unit 1202. The block compensation unit 1204 may apply a window $w_{oL}{}^r=[w_{oL-}1), \ldots, w_{oL}(0)]^T$ to the sub-block $\tilde{\tilde{s}}_{oL}(b-1)$. Accordingly, a sub-block $\tilde{s}_{oL}(b-1)$ where the window $w_{oL}{}^{\gamma}$ is applied to the sub-block $\tilde{\tilde{s}}_{oL}(b-1)$, may be extracted according to Equation 12.

$$\tilde{s}_{oL}(b-1)=\tilde{\tilde{s}}_{oL}(b-1)\otimes w_{oL}{}^r \qquad \text{[Equation 12]}$$

Also, the block $\tilde{\tilde{X}}_{c1}{}^l$, extracted by the overlap-add operation unit 1304, may be applied to a synthesis window 1601 through the block compensation unit 1204.

For example, the block compensation unit 1204 may apply a synthesis window to the current frame 800. Here, the synthesis window may be configured as a window which has a value of 0 and corresponds to a first sub-block, a window corresponding to an additional information area of a second sub-block, and a window which has a value of 1 and corresponds to a remaining area of the second sub-block based on the folding point. The first sub-block may indicate the speech characteristic signal, and the second sub-block may indicate the audio characteristic signal. The block $\tilde{X}_{c1}{}^l$ where the synthesis window 1601 is applied may be represented as, $$\begin{aligned}\tilde{X}'^{l}_{c1} &= \tilde{\tilde{X}}^{l}_{c1}\otimes[w_z, \hat{w}_2]^T\\ &= \Big[\underbrace{0, \ldots, 0}_{N/4}, \tilde{\tilde{s}}(b-1)\otimes\hat{w}_2^T\Big]^T\\ &= \Big[\underbrace{0, \ldots, 0}_{N/4}, \tilde{\tilde{s}}_{oL}(b-1)\otimes\hat{w}_{oL}^T, \tilde{\tilde{s}}_{N/4-oL}(b-1)\Big]^T\end{aligned} \qquad \text{[Equation 13]}$$

That is, the synthesis window may be applied to the block $\tilde{X}_{c1}^{l}$. The synthesis window may include an area $W_1$ of 0, and have an area corresponding to the sub-block $\tilde{s}$(b−1) which is identical to $\hat{w}_2$ in FIG. 8. In this instance, the sub-block $\tilde{\hat{s}}$(b−1) included in the block $\tilde{\hat{X}}_{c1}^{l}$ may be determined by, $$\tilde{\hat{s}}(b-1)=[\tilde{s}_{oL}(b-1),\tilde{\hat{s}}_{N/4-oL}(b-1)]^T \quad \text{[Equation 14]}$$

Here, when the block compensation unit 1204 performs an overlap-add operation with respect to an area $W_{oL}$ in the synthesis windows 1601 and 1602, the sub-block $\tilde{s}$(b−1) corresponding to an area (oL) may be extracted from the sub-block $\tilde{\hat{s}}$(b−1). In this instance, the sub-block $\tilde{s}_{oL}$(b−1) may be determined according to Equation 15. Also, a sub-block $\tilde{\hat{s}}_{N/4-oL}$(b−1) corresponding to a remaining area excluding the area (oL) from the sub-block $\tilde{\hat{s}}$(b−1), may be determined according to Equation 16.

$$\tilde{s}_{oL}(b-1)=\tilde{s}'_{oL}(b-1)\otimes\tilde{\hat{s}}'_{oL}(b-1) \quad \text{[Equation 15]}$$

$$\tilde{\hat{s}}_{N/4-oL}(b-1)=[\tilde{\hat{s}}((b-2)\cdot N/4+oL), \ldots, \tilde{\hat{s}}((b-2)\cdot N/4+N/4-1)]^T \quad \text{[Equation 16]}$$

Accordingly, an output signal $\tilde{s}$(b−1) may be extracted by the block compensation unit 1204.

Figure 17:
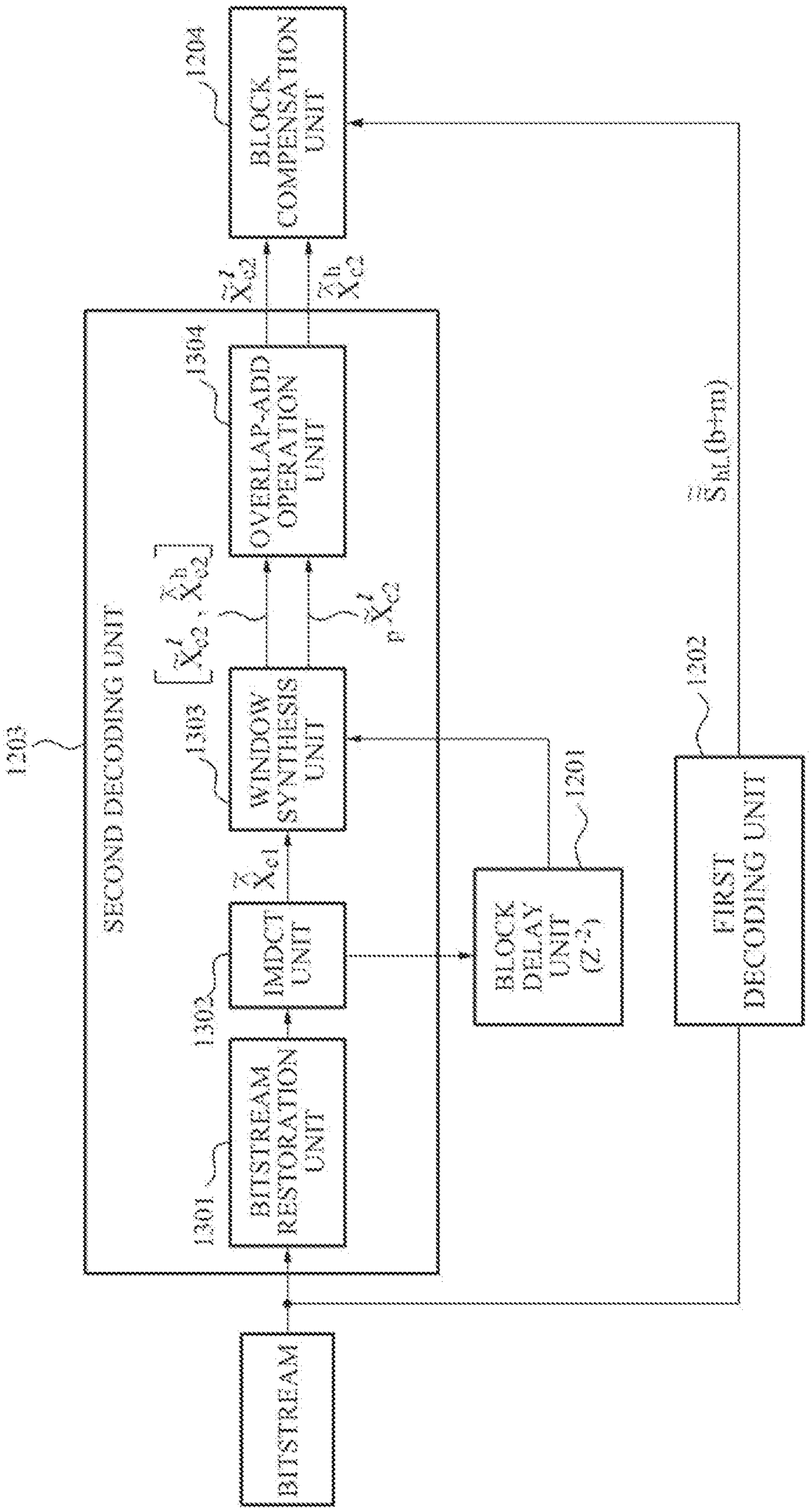
FIG. 17 is a diagram illustrating an operation of generating an output signal in a C2 according to an embodiment of the present invention.

FIG. 17 is a diagram illustrating an operation of generating an output signal in the C2 according to an embodiment of the present invention. That is, FIG. 17 illustrates an operation of decoding the input signal encoded in FIG. 9.

The C2 may denote a folding point where the speech characteristic signal is generated after the audio characteristic signal in the current frame 1000. In this instance, the folding point may be located at a point of 3N/4 in the current frame 1000.

The bitstream restoration unit 1301 may decode the inputted bitstream. Sequentially, the IMDCT unit 1302 may perform an MDCT with respect to a result of the decoding. The window synthesis unit 1303 may apply the synthesis window to a block $\tilde{\hat{X}}_{c2}^{l}$ in the current frame 1000 of the input signal encoded by the second encoding unit 205. That is, the second decoding unit 1203 may decode a block s(b+m−2) and a block s(b+m−1) which are not adjacent to the folding point in the current frame 1000 of the input signal.

In this instance, different from FIG. 13, a result of the MDCT may not pass the block delay unit 1201 in FIG. 17.

The result of applying the synthesis window to the block may be given by, $$\tilde{X}_{c2}^{i}=\tilde{\hat{X}}_{c2}^{l}\mathbf{237}[w_1,w_2]^T \quad \text{[Equation 17]}$$

The block $\tilde{\hat{X}}_{c2}^{l}$ may be used as a block signal for overlap with respect to the current frame 1000.

Only input signal corresponding to the block $\tilde{\hat{X}}_{c2}^{i}$ in the current frame 1000 may be restored by the second decoding unit 1203. Accordingly, since only block $\tilde{\hat{X}}_{c2}^{h}$ may exist in the current frame 1000, the overlap-add operation unit 1304 may restore an input signal corresponding to the block where the overlap-add operation is not performed. The block $\tilde{\hat{X}}_{c2}^{h}$ may be a block where the synthesis window is not applied by the second decoding unit 1203 in the current frame 1000. Also, the first decoding unit 1202 may decode additional information included in a bitstream, and thereby may output a sub-block $\tilde{\tilde{s}}_{hL}$(b+m).

The block $\tilde{\hat{s}}_{c2}^{h}$, extracted by the second decoding unit 1203, and the sub-block $\tilde{\hat{s}}$(b+m), extracted by the first decoding unit 1202, may be inputted to the block compensation unit 1204. A final output signal may be generated by the block compensation unit 1204.

Figure 18:
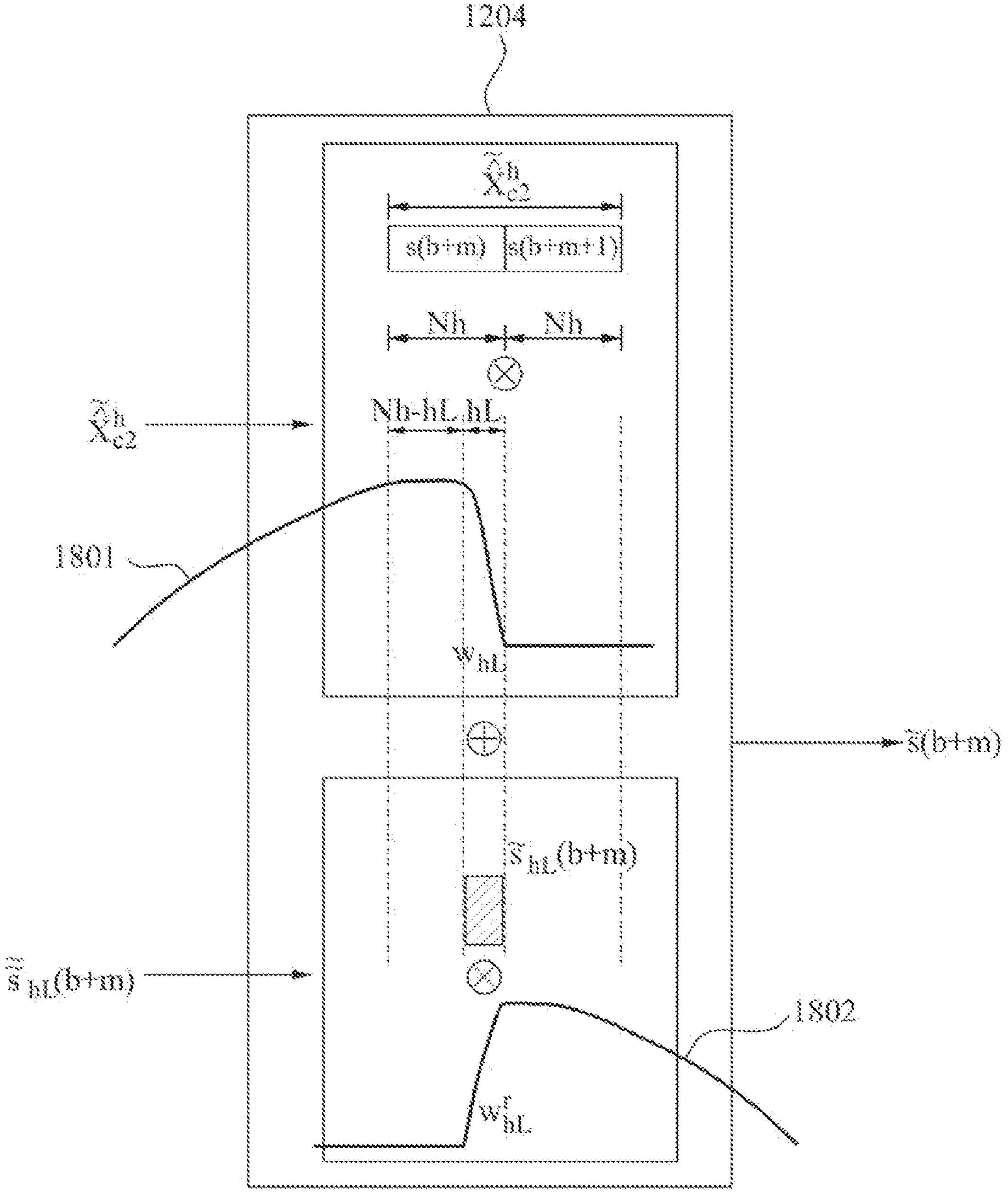
FIG. 18 is a diagram illustrating a block compensation operation in a C2 according to an embodiment of the present invention.

FIG. 18 is a diagram illustrating; a block compensation operation in the C2 according to an embodiment of the present invention.

The block compensation unit 1204 may perform block compensation with respect to the result of the first decoding unit 1202 and the result of the second decoding unit 1203, and thereby may restore the input signal. For example, when a folding point where switching occurs between a speech characteristic signal and an audio characteristic signal exists in a current frame of the input signal, the block compensation unit 1204 may apply a synthesis window which does not exceed the folding point.

In FIG. 17, additional information, that is, the sub-block $\tilde{\tilde{s}}_{hL}$(b+m) may be extracted by the first decoding unit 1202. The block compensation unit 1204 may apply a window $w_{hL}^{r}=[w_{hL}(hL-1), \ldots, w_{hL}(0)]^T$ to the sub-block $\tilde{\tilde{s}}_{hL}$(b+m). Accordingly a sub-block $\tilde{s}'_{hL}$(b+m) where the window $w_{hL}^{\gamma}$ is applied to the sub-block $\tilde{\tilde{s}}_{hL}$(b+m), may be extracted according to Equation 18.

$$\tilde{s}'_{hL}(b+m)=\tilde{s}_{hL}(b+m)\otimes w_{hL}^{r} \quad \text{[Equation 18]}$$

Also, the block $\tilde{\hat{s}}_{c2}^{h}$, extracted by the overlap-add operation unit 1304, may be applied to a synthesis window 1801 through the block compensation unit 1204. For example, the block compensation unit 1204 may apply a synthesis window to the current frame 1000. Here, the synthesis window may be configured as a window which has a value of 0 and corresponds to a first sub-block, a window corresponding to an additional information area of a second sub-block, and a window which has a value of 1 and corresponds to a remaining area of the second sub-block based on the folding point. The first sub-block may indicate the speech characteristic signal, and the second sub-block may indicate the audio characteristic signal. The block $\tilde{X}'^{h}_{c2}$ where the synthesis window 1801 is applied may be represented as, $$\begin{aligned} \tilde{X}_{c2}^{\prime h} &= \tilde{\hat{X}}_{c2}^{h} \otimes [\hat{w}_3, w_z]^T \\ &= \Big[\tilde{\hat{s}}(b+m) \otimes \hat{w}_3^T, \underbrace{0, \ldots, 0}_{N/4}\Big]^T \\ &= \Big[\tilde{\hat{s}}_{N/4-hL}(b+m), \tilde{\hat{s}}_{hL}(b+m) \otimes \hat{w}_{hL}^T, \underbrace{0, \ldots, 0}_{N/4}\Big]^T \end{aligned} \quad \text{[Equation 19]}$$

That is, the synthesis window 1801 may be applied to the block $\tilde{x}_{c2}^{h}$. The synthesis window 1801 may include an area corresponding to the sub-block s(b+m) of 0, and have an area corresponding to the sub-block s(b+m+1) which is identical to in FIG. 10. In this instance, the sub-block $\tilde{s}$(b+m) included in the block $\tilde{\hat{s}}_{c2}^{h}$ may be determined by, $$\tilde{s}(b+m)=[\tilde{\hat{s}}_{N/4-hL}(b+m),\tilde{s}'_{hL}(b+m)]^T \quad \text{[Equation 20]}$$

Here, when the block compensation unit 1204 performs an overlap-add operation with respect to an area $W_{hL}$ in the synthesis windows 1801 and 1802, the sub-block $\tilde{s}_{hL}$(b+m) corresponding to an area (hL) may be extracted from the sub-blocks $\tilde{s}$(b+m). In this instance, the sub-block $\tilde{s}_{hL}^{l}$(b+m) may be determined according to Equation 21. Also, a sub-block $\tilde{\hat{s}}_{N/4-hL}$(b+m) corresponding to a remaining area excluding the area (hL) from the sub-block $\tilde{s}$(b+m), may be determined according to Equation 22.

$$\tilde{s}_{hL}(b+m)=\tilde{s}'_{hL}(b+m)\otimes\tilde{\hat{s}}'_{hL}(b=m) \quad \text{[Equation 21]}$$

$$\tilde{\hat{s}}_{N/4-hL}(b+m)=[\tilde{\hat{s}}((b+m-1)\cdot N/4), \ldots, \tilde{\hat{s}}((b+m-1)\cdot N/4+hL-1)]^T \quad \text{[Equation 22]}$$

Accordingly, an output signal $\tilde{s}(b+m)$ may be extracted by the block compensation unit 1204.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A coding method performed by a device, comprising:

identifying a previous frame which has a speech characteristic to be coded in a time domain;

identifying a current frame which has an audio characteristic to be coded in a frequency domain;

processing for modifying a specific area of the previous frame to be overlap-added with the current frame; and performing an overlap-add on a first signal for the specific area of the previous frame and a second signal for the current frame, wherein the specific area is modified based on a length of additional MDCT information, wherein the previous frame is divided into a first area and a second area, wherein the second area is located after the first area in the previous frame, wherein the specific area corresponds to the second area, wherein the current frame is coded according to the MDCT by applying a first window into the additional MDCT information, applying a second window into the current frame, and performing the overlap-add between the additional MDCT information applied to the first window and the current frame applied to second window, in a decoding processing, and wherein the additional MDCT information is extracted from a delayed block in the previous frame with respect to a block of the current frame.

2. The coding method of claim 1, wherein the previous frame is coded with CELP(code-excited linear prediction), and the current frame is coded with MDCT(Modified Discrete Cosine Transform).

3. The coding method of claim 1, wherein the specific area is modified for artificially compensating a time-domain aliasing introduced by processing the current frame using a frequency domain coding.

4. The coding method of claim 1, wherein the specific area is modified based on artificial TDA(time domain aliasing) signal.

5. The coding method of claim 1, wherein the specific area is modified using a sine window corresponding to a left portion of the window for the current frame.

* * * * *